United States Patent
Brock et al.

(10) Patent No.: US 10,458,366 B2
(45) Date of Patent: Oct. 29, 2019

(54) FUEL TANK PRESSURE REGULATOR

(71) Applicant: Stant USA Corp., Connersville, IN (US)

(72) Inventors: Michael S. Brock, Connersville, IN (US); Kevin L. Young, Connersville, IN (US); John Brian Anderson, Liberty, IN (US)

(73) Assignee: Stant USA Corp., Connersville, IN (US)

( * ) Notice: Subject to any disclaimer, the term of this patent is extended or adjusted under 35 U.S.C. 154(b) by 126 days.

(21) Appl. No.: 15/720,586

(22) Filed: Sep. 29, 2017

(65) Prior Publication Data

US 2018/0119650 A1    May 3, 2018

Related U.S. Application Data

(60) Provisional application No. 62/415,036, filed on Oct. 31, 2016.

(51) Int. Cl.
| | | |
|---|---|---|
| *B60K 15/035* | (2006.01) | |
| *F02M 25/08* | (2006.01) | |
| *F16K 31/06* | (2006.01) | |
| *F16K 24/00* | (2006.01) | |
| *B60K 15/03* | (2006.01) | |

(52) U.S. Cl.
CPC ... *F02M 25/0836* (2013.01); *B60K 15/03504* (2013.01); *B60K 15/03519* (2013.01); *F16K 24/00* (2013.01); *F16K 31/0655* (2013.01); *B60K 2015/03296* (2013.01); *B60K 2015/03514* (2013.01); *B60K 2015/03585* (2013.01); *F02M 2025/0845* (2013.01)

(58) Field of Classification Search
None
See application file for complete search history.

(56) References Cited

U.S. PATENT DOCUMENTS

| | | | | |
|---|---|---|---|---|
| 3,872,878 | A | * | 3/1975 | Kozel ............... F16K 31/404 137/242 |
| 4,387,878 | A | * | 6/1983 | Zukausky ........... F16K 31/404 251/30.03 |
| 4,392,507 | A | | 7/1983 | Harris |
| 4,651,971 | A | * | 3/1987 | Donahue, Jr. ....... F16K 31/404 137/550 |
| 4,715,403 | A | | 12/1987 | Szlaga |
| 4,742,844 | A | | 5/1988 | Szlaga |
| 4,805,663 | A | | 2/1989 | Szlaga |
| 4,869,461 | A | | 9/1989 | Perry |
| 5,069,188 | A | | 12/1991 | Cook |
| 5,388,611 | A | | 2/1995 | Harris |
| 5,419,367 | A | | 5/1995 | Noya |
| 5,584,278 | A | | 12/1996 | Satoh |

(Continued)

FOREIGN PATENT DOCUMENTS

| | | |
|---|---|---|
| JP | 2013170506 | 9/2013 |
| WO | 20100122414 A1 | 10/2010 |

OTHER PUBLICATIONS

PCT Search Report and Written Opinion completed by the ISA/KR on Feb. 2, 2018 and issued in connection with PCT/US2017/058287.

*Primary Examiner* — John Fox
(74) *Attorney, Agent, or Firm* — Barnes & Thornburg LLP

(57) ABSTRACT

A venting apparatus is provided for regulating discharge of fuel vapor from a fuel tank and admission of outside air into the fuel tank.

14 Claims, 9 Drawing Sheets

(56) References Cited

U.S. PATENT DOCUMENTS

| | | |
|---|---|---|
| 5,605,177 A | 2/1997 | Ohashi |
| 6,003,499 A | 12/1999 | Devall et al. |
| 6,386,222 B1 | 5/2002 | Harris |
| 6,481,592 B2 | 11/2002 | Harris |
| 6,561,211 B2 | 5/2003 | Devall |
| 6,779,544 B2 | 8/2004 | Devall |
| 7,270,117 B1 | 9/2007 | Devall |
| 7,270,310 B2 * | 9/2007 | Takakura ............... F16K 24/04 251/30.04 |
| 7,325,577 B2 | 2/2008 | Devall |
| 7,481,412 B2 * | 1/2009 | Ishikawa ............. F16K 31/0658 251/30.04 |
| 7,556,067 B2 | 7/2009 | McClung |
| 7,568,494 B2 | 8/2009 | Devall |
| 7,823,610 B2 | 11/2010 | King |
| 8,573,255 B2 | 11/2013 | Pifer |
| 8,584,704 B2 | 11/2013 | Pifer et al. |
| 8,833,573 B2 | 9/2014 | Tomaszewski et al. |
| 8,844,561 B2 | 9/2014 | Keller et al. |
| 8,944,101 B2 | 2/2015 | Pifer |
| 9,359,977 B2 | 6/2016 | Brock et al. |
| 9,371,803 B2 | 6/2016 | Pifer |
| 2001/0017160 A1 | 8/2001 | Ishigaki |
| 2002/0078932 A1 | 6/2002 | Weldon et al. |
| 2006/0011257 A1 | 1/2006 | Devall |
| 2006/0185735 A1 | 8/2006 | Tsuge |
| 2006/0207663 A1 | 9/2006 | Tsuge |
| 2007/0101974 A1 | 5/2007 | Achor |
| 2007/0261752 A1 | 11/2007 | McClung et al. |
| 2010/0269921 A1 | 10/2010 | Pifer |
| 2011/0240145 A1 | 10/2011 | Pifer |
| 2012/0073548 A1 | 3/2012 | Lee et al. |
| 2015/0144819 A1 | 5/2015 | Pifer |
| 2016/0298778 A1 | 10/2016 | Young |
| 2016/0311315 A1 | 10/2016 | Young |

* cited by examiner

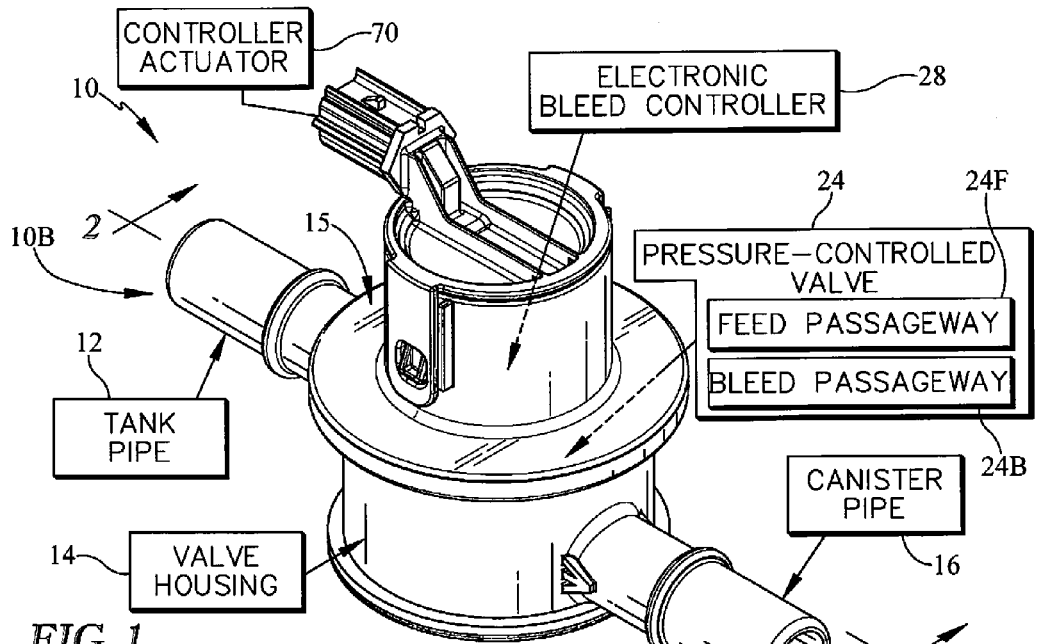
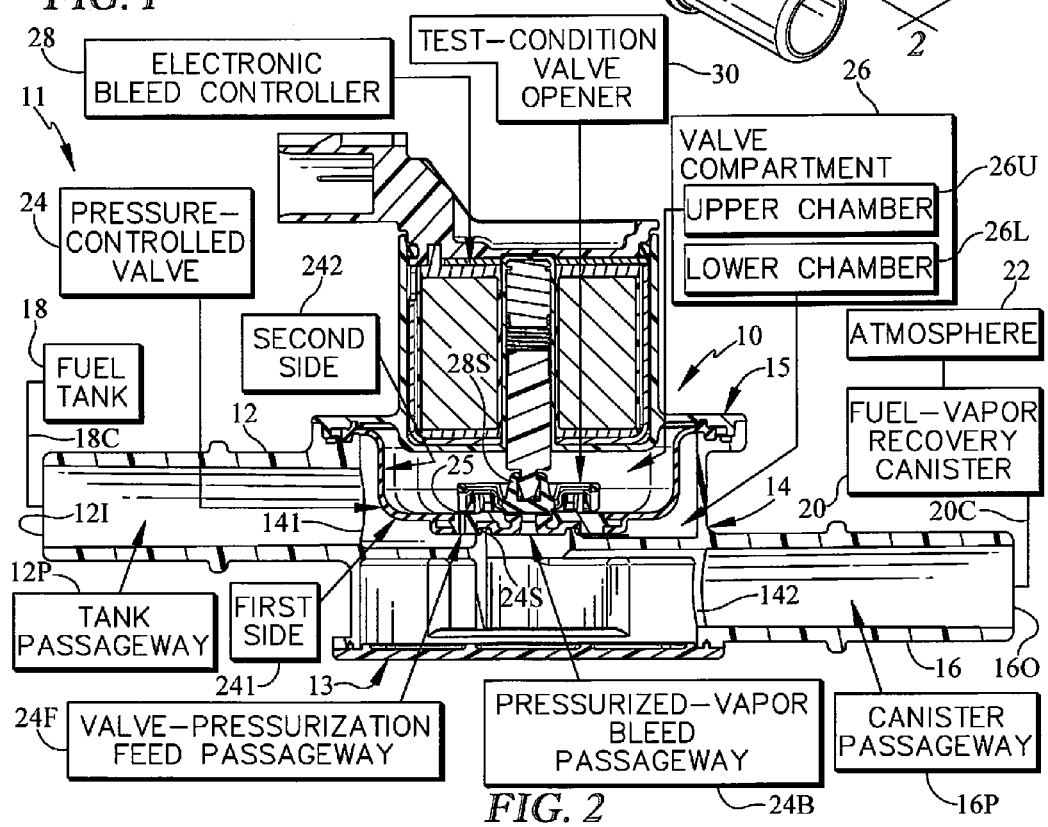

FUEL TANK PRESSURE REGULATOR

PRIORITY CLAIM

This application claims priority under 35 U.S.C. § 119(e) to U.S. Provisional Application No. 62/415,036, filed Oct. 31, 2016, which is expressly incorporated by reference herein.

BACKGROUND

The present disclosure relates to fuel tank vent valves, and particularly to venting apparatus for regulating discharge of fuel vapor from a fuel tank and admission of outside air into the fuel tank. More particularly, the present disclosure relates to a fuel tank pressure regulator including a fuel tank vent valve.

Vehicle fuel systems include valves associated with a fuel tank and are configured to vent pressurized or displaced fuel vapor from the vapor space in the fuel tank to a vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

SUMMARY

A tank venting system in accordance with the present disclosure includes a vent apparatus for regulating flow of fuel vapor between a fuel tank and a fuel vapor recovery system in a vehicle. The flow of fuel vapor is controlled to maintain the pressure of fuel vapor in the fuel tank at a certain pressure level or within a certain pressure range during different modes of use.

A tank venting system in accordance with the present disclosure includes a vent apparatus for regulating flow of fuel vapor between a fuel tank and a fuel-vapor recovery system in a vehicle. The flow of fuel vapor is controlled to maintain the pressure of fuel vapor in the fuel tank at a certain pressure level or within a certain pressure range during different modes of use.

In illustrative embodiments, the vent apparatus includes a pressure-controlled valve configured to regulate a relatively large volume of pressurized fuel vapor flow from a fuel tank to a fuel-vapor recovery canister along a first vapor flow path under the pressure-controlled valve and an electronic bleed controller configured to regulate flow of a relatively small volume of fuel vapor flow from the fuel tank to the fuel-vapor recovery canister along a second vapor flow path through a pressurized-vapor bleed passageway formed in the pressure-controlled valve when the pressure-controlled valve is closed. By regulating the relatively small volume of fuel vapor flow from the fuel tank to the fuel-vapor recovery canister, the electronic bleed controller adjusts pressure applied to the pressure-controlled valve such that opening and closing of the pressure-controlled valve can be controlled by the electronic bleed controller.

In illustrative embodiments, the pressure-controlled valve is movable from a normally closed position arranged to block fuel vapor flow along the first vapor flow path to an opened position arranged to allow fuel vapor flow along the first vapor flow path. The pressure-controlled valve includes a deformable diaphragm that flexes in response to a pressure differential being applied to opposing sides of the pressure-controlled valve to move the pressure-controlled valve from the closed position to the opened position. A bias spring included in the electronic bleed controller is configured to encourage the pressure-controlled valve to move toward the normally closed position.

In illustrative embodiments, the pressure-controlled valve has a center portion formed to include a pressurized-vapor bleed passageway and a peripheral portion formed to include a valve-pressurization feed passageway. The electronic bleed controller is arranged normally to close the pressurized-vapor bleed passageway. Pressurized fuel vapor discharged into the vent apparatus from the fuel tank flows through the valve-pressurization feed passageway into a region above the pressure-controlled valve and applies a force to a topside of the pressure-controlled valve that cause the valve to move to a closed position to block flow of pressurized fuel vapor from the fuel tank to the fuel-vapor recovery canister along the first fuel vapor path through the vent apparatus.

In illustrative embodiments, in use, the pressure-controlled valve remains in the closed position until the electronic bleed controller is activated to open the pressurized-vapor bleed passageway to allow pressurized fuel vaper above the topside of the pressure-controlled valve to escape and pass through the pressurized-vapor bleed passageway and flow along the second vapor flow path through the vent apparatus to the fuel-vapor recovery canister. Such an escape of pressurized fuel vapor lowers the pressure of pressurized fuel vapor in the region above the topside of the pressure-controlled valve and causes the pressure-controlled valve to move from a closed position to an opened position thereby opening the first vapor flow path so that a large volume of pressurized fuel vapor can flow from the fuel tank to the fuel-vapor recovery canister through the vent apparatus along the first vapor flow path.

In illustrative embodiments, the vent apparatus includes a housing formed to include a tank pipe coupled to a fuel tank, a canister pipe coupled to a fuel-vapor recovery canister, and a valve compartment provided between the tank and canister pipes. The valve compartment is arranged to interconnect the tank and canister pipes in fluid communication to conduct pressurized fuel vapor discharged from the tank pipe into the canister pipe for delivery to the fuel-vaper recovery canister so that contaminants entrained in the pressurized fuel vapor can be trapped in the fuel-vaper recovery canister to block discharge of such contaminants from the fuel-vaper recovery canister to the atmosphere.

In illustrative embodiments, the pressure-controlled valve is mounted in the valve compartment formed in the housing to divide the housing into an upper chamber above the pressure-controlled valve and a lower chamber below the pressure-controlled valve. The valve-pressurization feed passageway has an inlet opening into the lower chamber and an outlet opening into the upper chamber. When the pressure-controlled valve is opened, the first vaper flow path established in the vent apparatus passes, in sequence, through the tank pipe, the lower chamber of the valve compartment, and the canister pipe. When the pressure-controlled valve is closed (and opened), the second vapor flow path established in the vent apparatus passes, in sequence, through the tank pipe, the lower chamber, the valve-pressurization feed passageway, the upper chamber, the pressurized-vapor bleed passageway, and the canister pipe.

In illustrative embodiments, the electronic bleed controller is movable from a closed position arranged to block fuel vapor flow along the second vapor flow path to an opened position arranged to allow pressurized fuel vapor flow along the second vapor flow path from the upper chamber into the canister pipe. The electronic bleed controller includes a bleed-passageway stopper located in the upper chamber and configured to move into and out of the pressurized-vapor bleed passageway and an electro-magnetic actuator configured to move the bleed-passageway stopper. A valve-mover controller is coupled to the electro-magnetic actuator to open and close the electronically-controlled valve under predetermined conditions.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a vent apparatus made in accordance with the present disclosure for use in a tank venting system also including a fuel tank and a fuel-vapor recovery canister and suggesting that the vent apparatus includes a pressure-controlled valve formed to include a valve-pressurization feed passageway and a separate pressurized-vapor bleed passageway and suggesting that the vent apparatus also includes an electronic bleed controller that is located above the pressure-controlled valve and configured to control opening and closing of the pressurized-vapor bleed passageway to lower the pressure that is applied to a topside of the pressure-controlled valve as suggested in FIG. 8 to cause the pressure-controlled valve to move from a closed position as suggested in FIGS. 2 and 6 to an opened position as suggested in FIG. 9 to vent pressurized fuel vapor from a tank pipe of the vent apparatus to a canister pipe of the vent apparatus;

FIG. 2 is an enlarged sectional view of the vent apparatus of FIG. 1 after incorporation into a tank venting system to couple an inlet end of the tank pipe to a fuel tank and an outlet end of the canister pipe to a fuel-vapor recovery canister that is open to the atmosphere and showing that the pressure-controlled valve is a differential-pressure valve that is mounted in a valve compartment formed in a housing included in the vent apparatus to divide the valve compartment into an upper (chamber) portion above a topside of the pressure-controlled valve and a lower (chamber) portion below an underside of the pressure-controlled valve and showing the pressure-controlled valve in a closed position engaging an underlying valve seat provide in the housing as shown also in FIG. 4 to block flow of pressurized fuel vapor from a tank passageway that is coupled to the fuel tank to along a first vapor flow path a canister passageway that is coupled to the fuel-vapor recovery canister;

DETAILED DESCRIPTION

Figure 3:
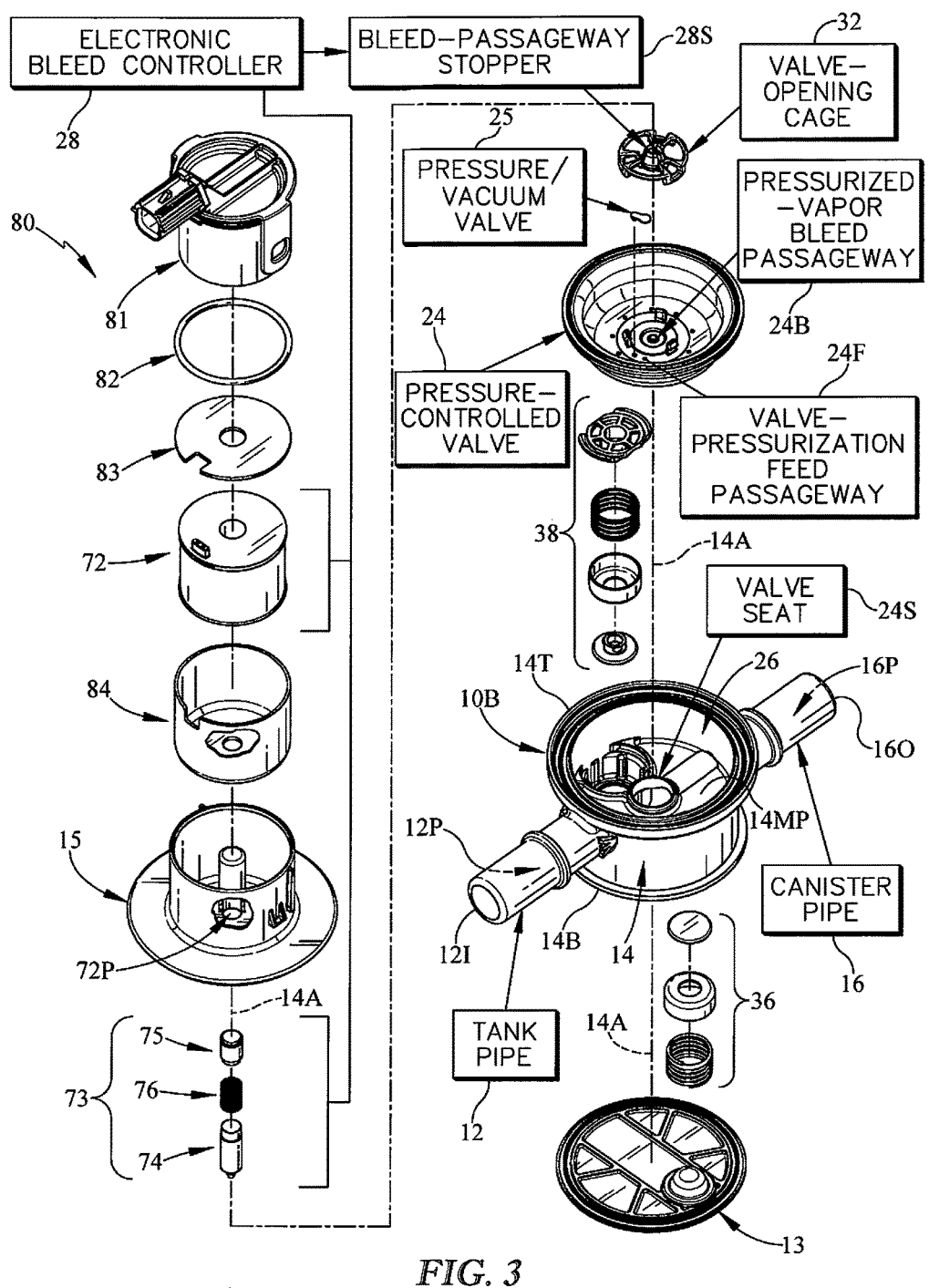
FIG. 3 is an exploded perspective assembly view of components included in the vent apparatus and showing that the pressure-controlled valve is formed to include a central pressurized-vapor bleed passageway and a peripheral valve-pressurization feed passageway and showing a small pliable pressure/vacuum valve that can be mounted on the topside of the pressure-controlled valve to cover the valve-pressurization feed passageway and regulate flow of fuel vapor therethrough as shown, for example, in FIGS. 6 (valve flap closed) and 7 (valve flap opened) and showing that the electronic bleed controller includes a bleed-passageway stopper that can be moved relative to the pressure-controlled valve to open and close the pressurized-vapor bleed passageway formed in the pressure-controlled valve.

A vent apparatus 10 includes, in series, a tank pipe 12, valve housing 14, and a canister pipe 16 as shown, for example, in FIGS. 1 and 2. An inlet end 121 of tank pipe 12 is coupled to a fuel tank 18 to receive pressurized fuel vapor ($V_T$) discharged by fuel tank 18 as suggested in FIGS. 2 and 7-9. An outlet end 160 of canister pipe 16 is coupled to a downstream fuel-vapor recovery canister 20 to discharge all pressurized fuel vapor ($V_d$ or $V_D$) that flows out of valve housing 14 and through canister pipe 16 into the downstream fuel-vapor recovery canister 20 for containment filtration so that only filtered air is discharged from fuel-vapor recovery canister 20 to the surrounding atmosphere 22.

Figure 4:
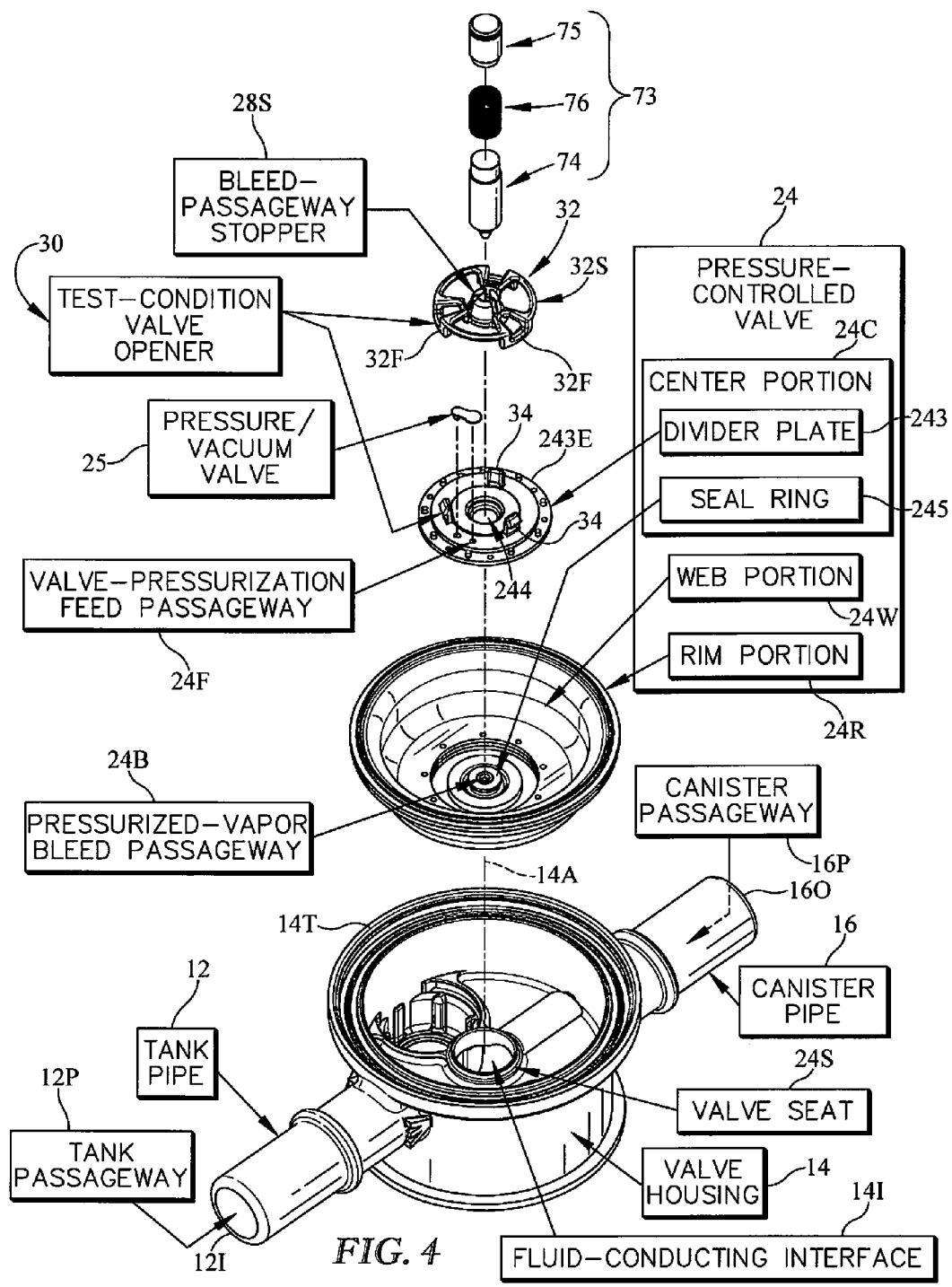
FIG. 4 is an enlarged exploded perspective view of some components included in the vent apparatus of FIGS. 1-3 showing features of the pressure-controlled valve in more detail and showing the annular valve seat formed in the housing and components included in a test-condition valve opener that is coupled to the electronic bleed controller and used in accordance with the present disclosure to open the pressure-controlled valve during a pressurized On-Board Diagnostic (OBD) II test condition.

A pressure-controlled valve 24 is also included in vent apparatus 10 as shown diagrammatically in FIG. 1 and illustratively in FIGS. 2-4. Pressure-controlled valve 24 is formed to include a valve-pressurization feed passageway 24F and a separate pressurized-vapor bleed passageway 24B as suggested in FIGS. 1-4.

Figure 7:
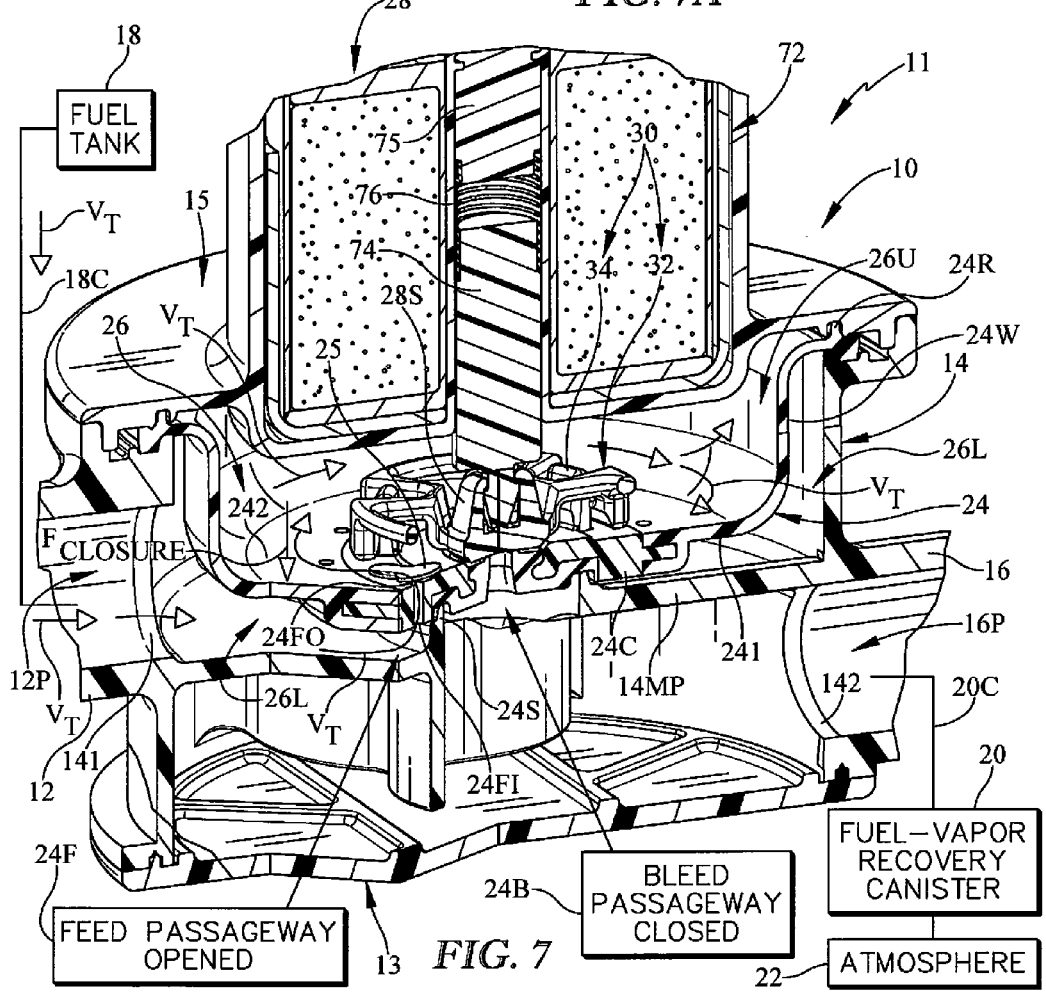
FIG. 7 is an enlarged view taken from the circled region of FIG. 6 showing flow of pressurized fuel vapor (VT) from the fuel tank through the tank passageway, the lower (chamber) portion of the valve compartment, and up into the upper (chamber) portion of the valve compartment through the valve-pressurization feed passageway formed in the pressure-controlled valve past the opened pressure-vacuum valve.
Figure 8A:
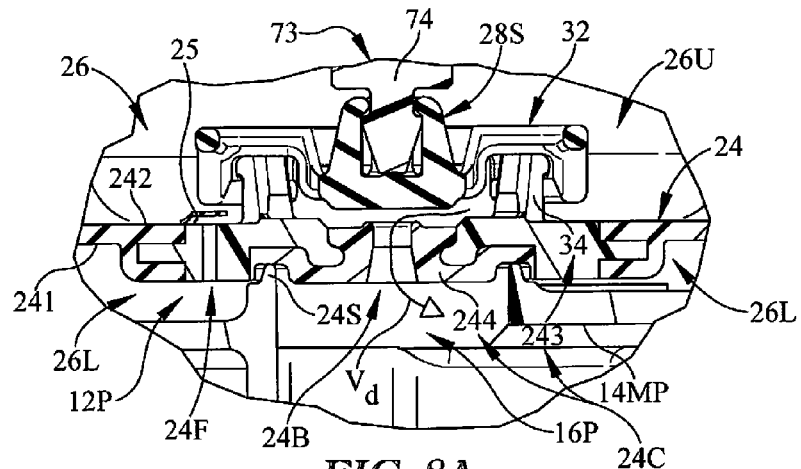
FIG. 8A is a reduced side elevation view of a portion of FIG. 7.
Figure 8:
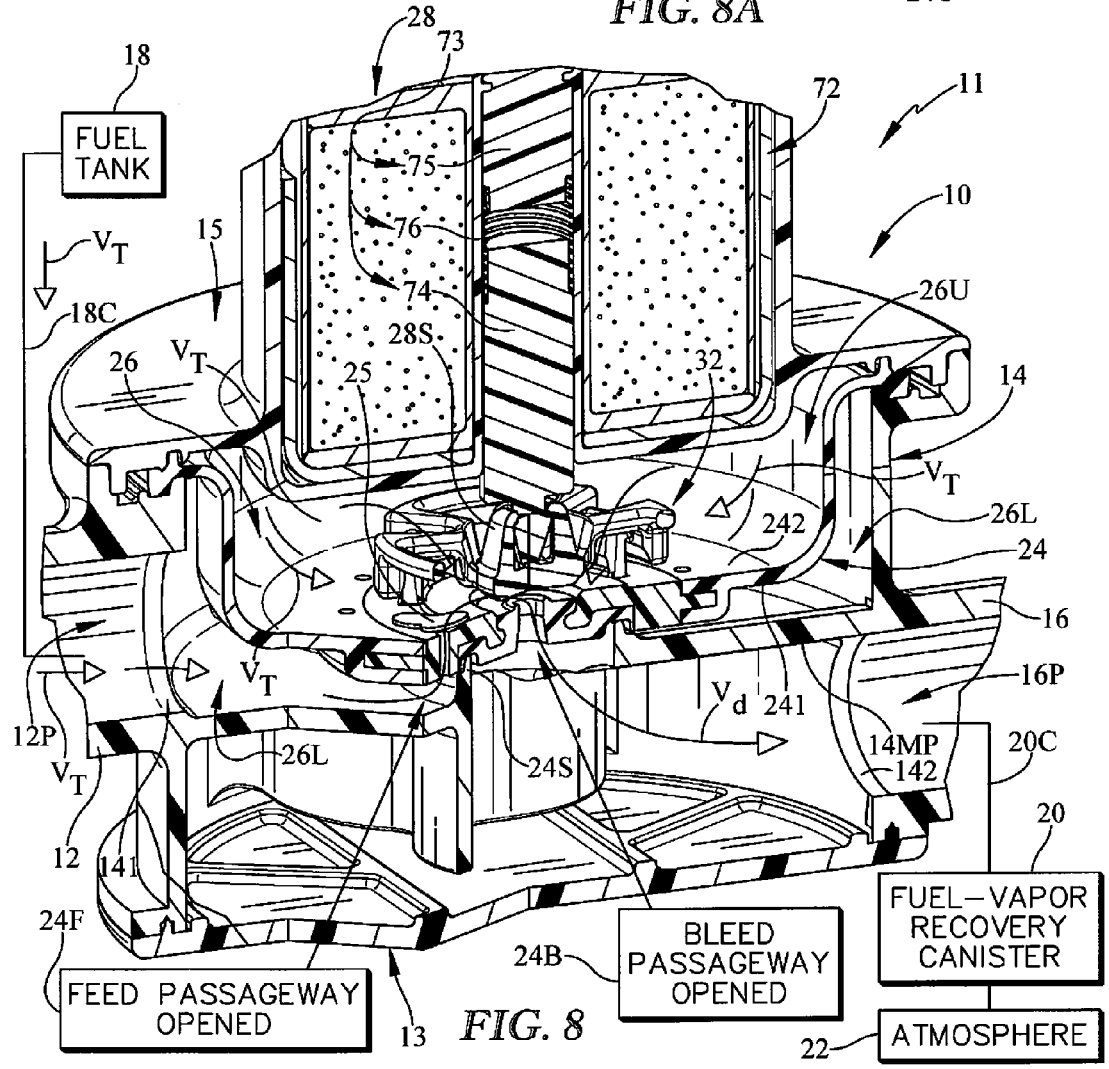
FIG. 8 is a view similar to FIG. 7 showing upward movement of the bleed-passageway stopper (caused by actuation of the electronic bleed controller) to an opened position disengaging the pressure-controlled valve to allow pressurized fuel vapor extant in the upper (chamber) portion of the valve compartment to be discharged into the canister passageway formed in the canister pipe through the opened pressurized-vapor bleed passageway formed in the pressure-controlled valve so that the pressure over the pressure-controlled valve in the upper (chamber) portion of the valve compartment decreases relative to the combined pressure under the pressure-controlled valve in the lower (chamber) portion of the valve compartment and to cause in the canister passageway of the canister pipe the pressure-controlled valve to move upwardly from the closed position to the opened position.
Figure 9A:
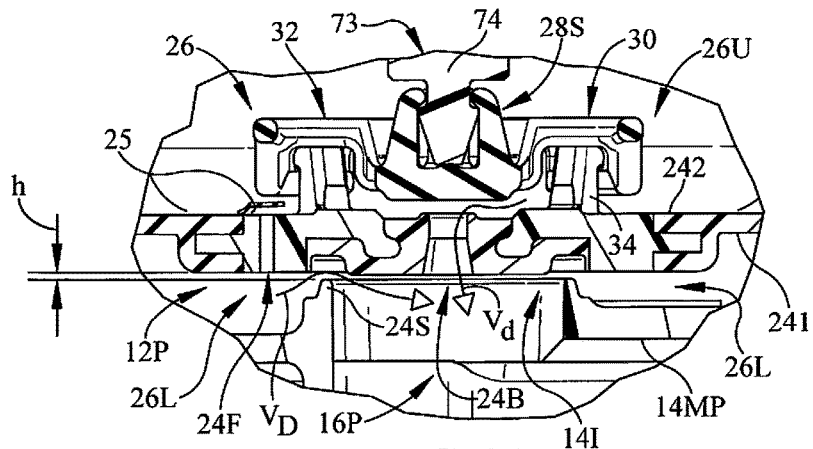
FIG. 9A is a reduced side elevation view of a portion of FIG. 9.
Figure 9:
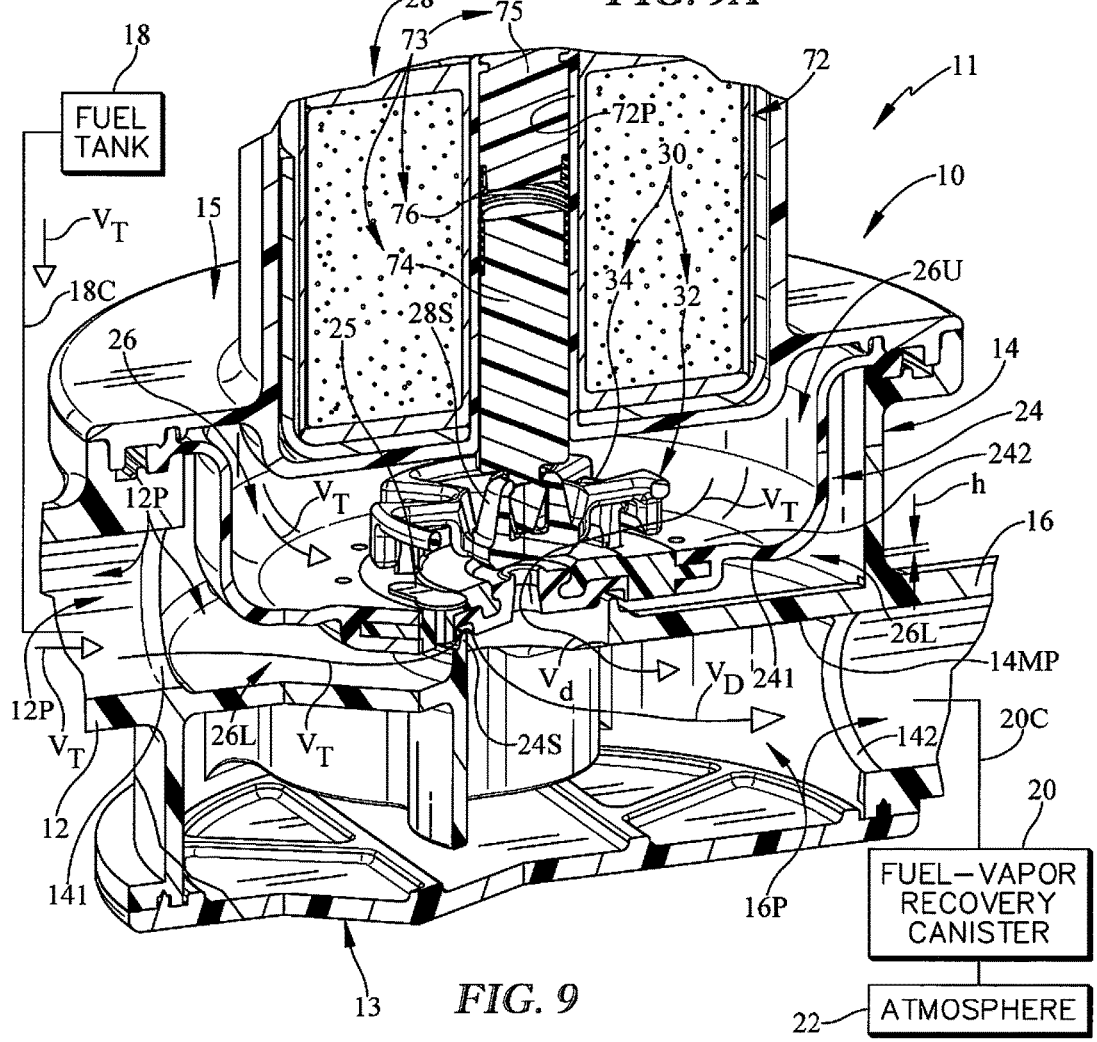
FIG. 9 is a view similar to FIGS. 7 and 8 showing upward movement of the pressure-controlled valve to an opened position away from the underlying annular valve seat during a normal fuel-tank venting activity to allow pressurized fuel vapor from the fuel tank to flow from the tank passageway past the opened pressure-controlled valve into the canister passageway on its way to the fuel-vapor recovery canister.
Figure 10A:
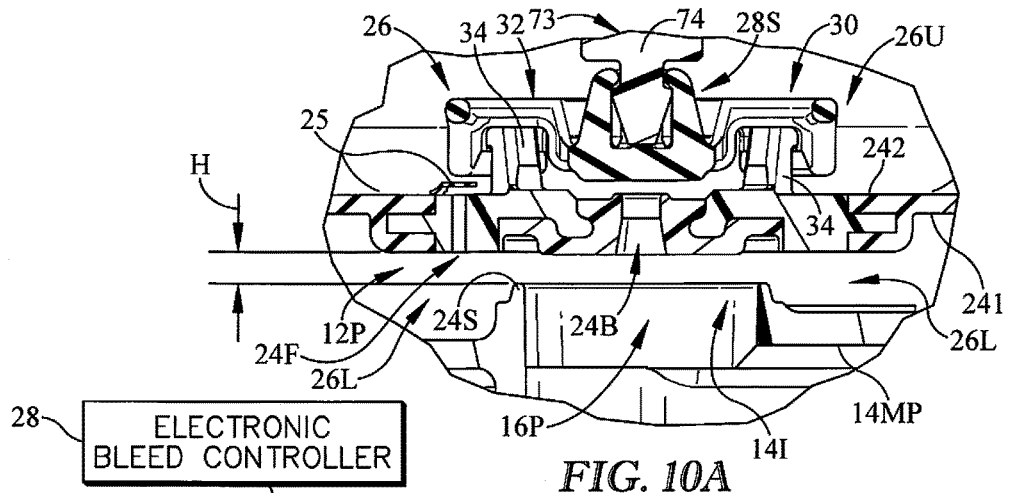
FIG. 10A is a reduced side elevation view of a portion of FIG. 10.
Figure 10:
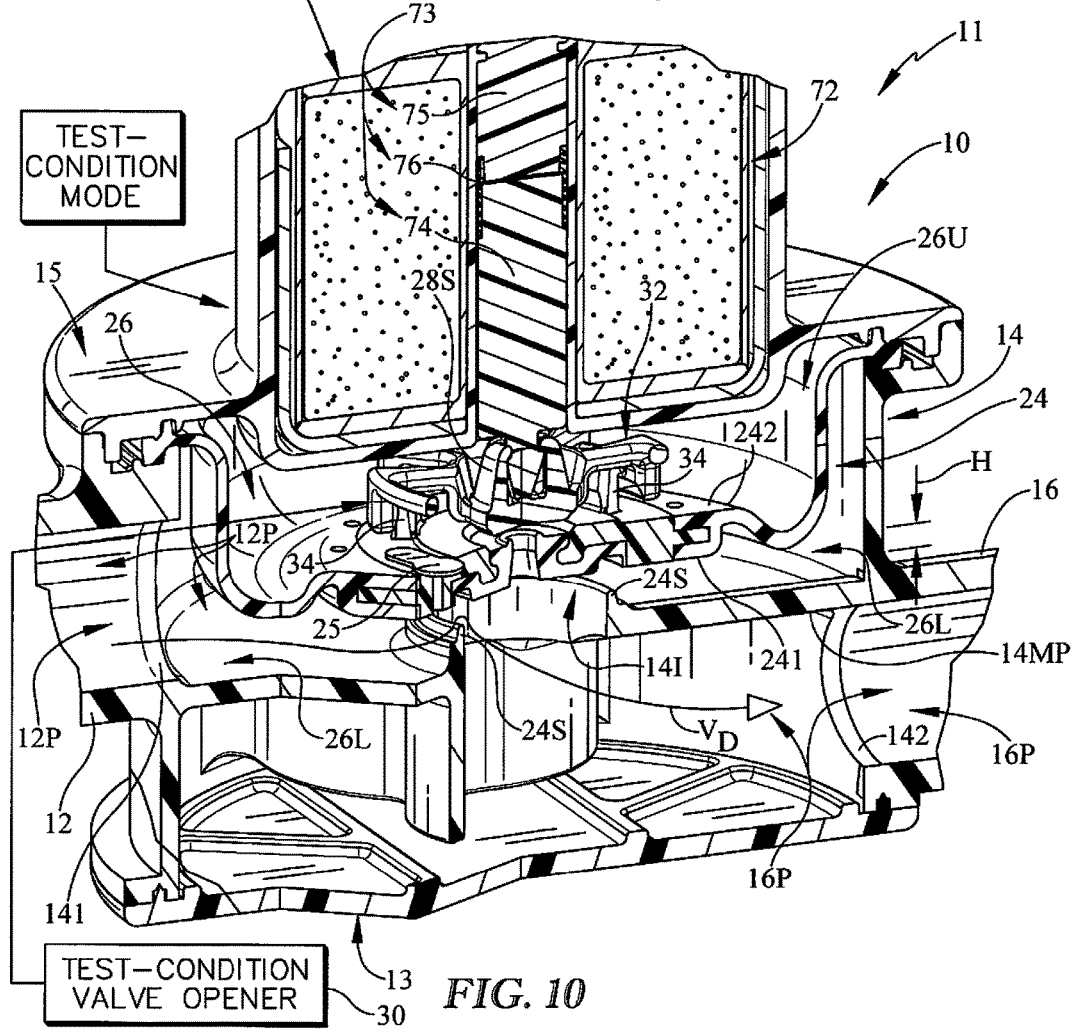
FIG. 10 is a view similar to FIGS. 7-9 during exposure of the vent apparatus to a pressured On-Board Diagnostic (OBD) II test condition during a vent-apparatus performance test to cause the pressure-controlled valve to stay open to allow a pressure pump (not shown) and a sensor-type system (not shown) associated with an OBD II to test to see the whole fuel system.

Pressure-controlled valve 24 is mounted in a valve compartment 26 formed in valve housing 14 for movement relative to valve housing 14 from a CLOSED POSITION shown, for example, in FIGS. 2, 6, 7, and 8 to a FIRST OPENED POSITION shown in FIG. 9 during normal fuel-tank venting activity and to a relatively larger SECOND OPENED POSITION shown in FIG. 10 during a vent-apparatus test-condition performance test. Pressure-controlled valve 24 is arranged to divide valve compartment 26 into separate lower and upper chambers 26L, 26U as suggested in FIG. 2. A bottomside 241 of the movable pressure-controlled valve 24 cooperates with a lower interior wall of valve housing 14 to define lower chamber 26L as suggested in FIG. 6. A topside 242 of the movable pressure-controlled valve 24 cooperates with an upper interior wall of valve housing 14 to define upper chamber 26U as suggested in FIGS. 2 and 6.

Pressure-controlled valve 24 is formed to include a valve-pressurization feed passageway 24F and a separate pressurized-vapor bleed passageway 24B as suggested diagrammatically in FIG. 1 and illustratively in FIGS. 2-5. Valve-pressurization feed passageway 24F functions to conduct pressurized fuel vapor ($V_T$) that has been discharged from fuel tank 18 and delivered into lower chamber 26L of valve housing 14 via tank pipe 12 into upper chamber 26U of valve housing 14. Pressurized-vapor bleed passageway 24B functions to conduct pressurized fuel vapor ($V_d$) from upper chamber 26U into canister pipe 16, for example, when pressure-controlled valve 24 is in the CLOSED POSITION and pressurized vapor bleed passageway 28B has been opened as suggested in FIG. 8. This bleed of pressurized fuel vapor from upper chamber 26U lowers the pressure extant in upper chamber 26U that is exposed to the topside 242 of pressure-controlled valve 24 as compared to the pressure that is exposed to the bottomside 241 of pressure-controlled valve 24 which pressure differential causes pressure-controlled valve 24 to move upwardly from the CLOSED POSITION shown in FIG. 8 through a first distance (h) to the FIRST OPENED POSITION shown in FIG. 9.

Figure 7A:
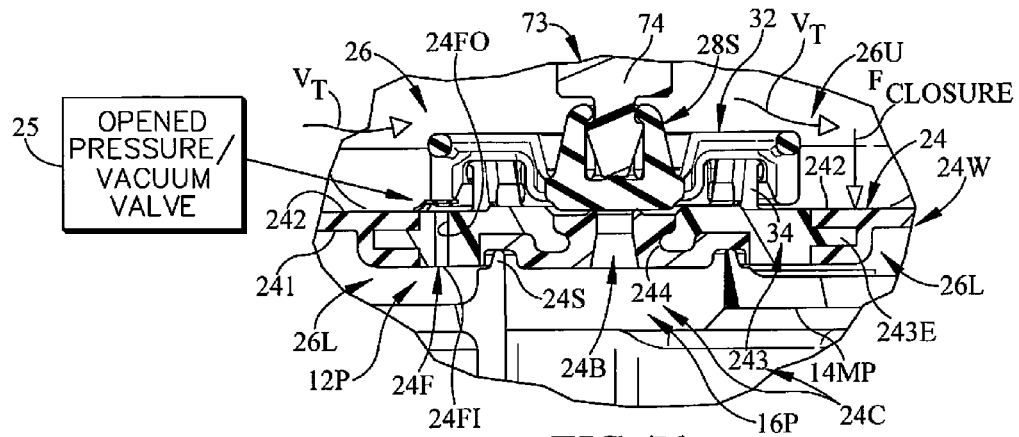
FIG. 7A is a reduced side elevation view of or portion of FIG. 7.

An electronic bleed controller 28 is also included in vent apparatus 10 and used to open and close the pressurized-vapor bleed passageway 24B formed in pressure-controlled valve 24 during a normal fuel-tank venting activity as suggested in FIGS. 7 and 8. In illustrative embodiments, electronic bleed controller 28 is arranged to extend downwardly through upper chamber 26U of valve compartment 26 and includes a bleed-passageway stopper 28S that is arranged to engage a topside 242 of pressure-controlled valve 24 to block discharge of pressurized fuel vapor from upper chamber 26U through the pressurized-vapor bleed passageway 24B. When activated electronically, bleed controller 28 causes bleed-passageway stopper 28S to rise upwardly to disengage topside 242 of pressure-controlled valve 24 so that pressurized fuel vapor ($V_d$) extant in upper chamber 26U can escape through the now opened pressurized-vapor bleed passageway 24B as shown in FIGS. 8 and 8A.

A test-condition valve opener 30 is also included in vent apparatus 10 and used to move the pressure-controlled valve 24 from the CLOSED POSITION through a relatively larger second distance (H) to the relatively larger SECOND OPENED POSITION in response to activation of the electronic bleed controller 28 during performance testing of the vent apparatus 10 as shown in FIGS. 10 and 10A. Test-condition valve opener 30 includes a valve-opening cage 32 that is coupled to bleed-passageway stopper 28S to move therewith and upstanding lift arms 34 that are coupled to topside 242 of pressure-controlled valve 24 to move therewith. During performance testing, electronic bleed controller 28 is activated to move bleed-passageway stopper 28S to a relatively high elevated position above topside 242 of pressure-controlled valve that is sufficient to cause valve-opening cage 32 to engage lift arms 34 and raise pressured-controlled valve 24 through the relatively larger distance (H) to the relatively high elevated position shown in FIG. 10. However, during normal fuel-tank venting activity, electronic bleed controller 28 is activated only to move bleed-passageway stopper 28S to a relatively lower elevated position above topside 242 of pressure-controlled valve 24 that is sufficient to move bleed-passageway stopper 28S upwardly away from topside 242 to open pressurized-vapor bleed passageway 24B as shown in FIGS. 9 and 9A. Such upward movement is not sufficient to cause valve-opening cage 32 to engage lift arms 34 and move pressure-controlled valve 24 away from the CLOSED POSITION.

An exploded perspective view of illustrative components that cooperate to form vent apparatus 10 is shown in FIG. 3. A body 10B is a monolithic component that comprises tank pipe 12, valve housing 14, and canister pipe 16. A bottom housing cover 13 is arranged to underlie and mate with a bottom side 14B of valve housing 14. A top housing cover 15 is arranged to overlie and mate with a top side of 14T valve housing 14. Each cover 13, 15 is welded to valve housing 14. Valve housing 14 includes a laterally extending middle plate 14MP located between covers 13, 15 and formed to include an upwardly extending annular valve seat 14S. A pressure-relief valve 36 is located between middle plate 14MP and bottom cover 13. A vacuum-relief valve 38 is located between middle plate 14MP and pressure-controlled valve 24. Electronic bleed controller 28 is coupled to top housing cover 15 and arranged to position bleed-passageway stopper 28S above the pressurized-vapor bleed passageway 24B formed in pressure-controlled valve 24.

Pressure-controlled valve 24 of vent apparatus 10 is mounted for movement in a valve compartment 26 formed in a valve housing 14 and configured to regulate a relatively large volume of fuel-vapor flow from a fuel tank 18 to a fuel-vapor recovery canister 20. Pressure-controlled valve 24 is formed to include a central pressurized-vapor bleed passageway 24B and a peripheral valve-pressurization feed passageway 24F as suggested in FIGS. 1-4. Pressurized fuel vapor ($V_T$) from fuel tank 18 can flow from bottomside 241 of pressure-controlled valve 24 upwardly through the peripheral valve-pressurization feed passageway 24F to push open a normally closed pressure-vacuum valve 25 mounted on a topside 242 of pressure-controlled valve 24 into an upper chamber 26U that is bounded, in part, by the topside 242 of pressure-controlled valve 24 so that the upper chamber 26U is filled with pressurized fuel vapor ($V_T$) that applies a downward valve-closing force ($F_{closure}$) to the topside 242 of pressure-controlled valve 24 as shown in FIGS. 7 and 7A. This valve-closing force ($F_{closure}$) causes the pressure-controlled valve 24 to close and generally remain closed.

Vent apparatus 10 also includes an electronic bleed controller 28 actuated to open and close the central pressurized-vapor bleed passageway 24B formed in pressure-controlled valve 24 at the option of a system operator. A system operator can use electronic bleed controller 28 to open the pressurized-vapor bleed passageway 24B while pressure-controlled valve 24 is closed to change the differential pressure that is applied to pressure-controlled valve 24 so that pressure-controlled valve 24 is moved away from an annular valve seat 24S to allow pressurized fuel vapor to flow from fuel tank 18 to fuel-vapor-recovery canister 20 past the opened pressure-controlled valve 24 along a first vapor flow path as suggested in FIGS. 9 and 9A. When electronic bleed controller 28 is actuated to allow a relatively small volume of pressurized fuel vapor ($V_d$) to flow downwardly through the central pressurized-vapor bleed passageway 24B from the upper chamber 26U provided above the topside 242 of pressure-controlled valve 24 along a second vapor flow path into the canister passageway 16P to the fuel-vapor recovery canister 20 while pressure-control valve 24 remains closed, the differential pressure that is applied to bottomside 241 and topside 242 of the pressure-controlled valve 24 is changed to encourage movement of pressure-controlled valve 24 from the CLOSED POSITION upwardly through a small first distance (h) to a FIRST OPENED POSITION to allow free flow of pressurized fuel vapor from fuel tank 18 past the opened pressure-controlled valve 24 to fuel-vapor recovery canister 20 as shown in FIGS. 9 and 9A.

In illustrative embodiments, pressure-controlled valve 24 is a DIFFERENTIAL-PRESSURE valve that is located to divide a valve compartment 26 formed in a valve housing 14 into separate lower and upper chambers 26L, 26U as shown in FIG. 2. Pressure-controlled valve 24 moves up and down in valve compartment 26 in response to changes in pressure that are applied to the topside 242 and bottomside 241 of pressure-controlled valve 24 as shown in FIGS. 7-9. An outer section of the underside 241 of pressure-controlled valve 24 is exposed to pressurized fuel vapor ($V_T$) conducted from fuel tank 18 through a tank passageway 12P formed in tank pipe 12. The outer section is formed to include the valve-pressurization feed passageway 24F to conduct pressurized fuel vapor ($V_T$) from fuel tank 18 into upper chamber 26U of valve compartment 26 when pressure-controlled valve 24 is closed as shown in FIGS. 7 and 7A. An inner portion of the bottomside 241 of pressure-controlled valve 24 is exposed to atmospheric air conducted from fuel-vapor recovery canister 20 through a canister passageway 16P formed in canister pipe 16 as shown in FIGS. 7 and 7A. The topside 242 of pressure-controlled valve 24 is exposed to pressurized fuel vapor ($V_T$) that passes from lower chamber 26L of valve compartment 26 that is coupled to tank passageway 12P into upper chamber 26U of valve compartment 26 through the valve-pressurization feed passageway 24F that is formed in the outer section of pressure-controlled valve 24 and past an opened pressure/vacuum valve 25 mounted on the topside 242 of pressure-controlled valve 24 as shown in FIGS. 2-5.

Valve housing 14 is formed to include an annular valve seat 24S that faces upwardly toward the underside 241 of pressure-controlled valve 24 and opens into the canister passageway 16P formed in valve housing 14 and in canister pipe 16 as shown in FIG. 2. When the pressure of fuel vapor in upper chamber 26U of valve compartment 26 is greater than the effective pressure in lower chamber 26L of valve compartment 26, such a TOP-HEAVY differential pressure causes pressure-controlled valve 24 to move downwardly in valve compartment 26 to assume a closed position engaging annular valve seat 24S and blocking flow of pressurized fuel vapor from tank passageway 12P into canister passageway 16P as shown in FIGS. 7 and 7A. However, if the pressure of fuel vapor in upper chamber 26U of valve compartment 26 is lesser than the effective pressure in lower chamber 26L of valve compartment 26, such a BOTTOM-HEAVY differential pressure causes pressure-controlled valve 24 to move upwardly in valve compartment 26 to an OPENED POSITION disengaging annular valve seat 24S and allowing flow of pressurized fuel vapor from tank passageway 12P into canister passageway 16P through a fluid-conducting interface 14I provided in valve housing 14 under the opened pressure-controlled valve 24 between the tank and canister passageways 12P, 16P as shown in FIGS. 9 and 9A. In this way, pressurized fuel vapor ($V_T$) can flow from fuel tank 18 into fuel-vapor recovery canister 20 for filtering treatment before the resultant filtered vapor is discharged to the atmosphere 22.

A center portion 24C of pressure-controlled valve 24 is formed to include a pressurized-vapor bleed passageway 24B that opens into canister passageway 16P when pressure-controlled valve 24 is closed as shown in FIG. 4. The pressurized-vapor bleed passageway 24B is normally closed by a bleed-passageway stopper 28S that is included in electronic bleed controller 28 to prevent any flow of pressurized fuel vapor from upper chamber 26U of valve compartment 26 through the pressurized-vapor bleed passageway 24B into canister passageway 16P. When the pressurized-vapor bleed passageway 24B is closed by bleed-passageway stopper 28S, upper chamber 26U of valve compartment 26 is filled with pressurized fuel vapor ($V_T$) that has flowed into that upper chamber 26U through the valve-pressurization feed passageway 24F formed in pressure-controlled valve 24 to create the TOP-HEAVY differential pressure that moves pressure-controlled valve 24 to the closed position as shown in FIGS. 7 and 7A. However, if the bleed-passageway stopper 28S is moved relative to valve housing 14 by an electronic actuator 28 to open the pressurized-vapor bleed passageway 24B as shown in FIGS. 8 and 8A, then pressurized fuel vapor ($V_d$) will be discharged from upper chamber 26U of the valve compartment 26 through the opened pressurized-vapor bleed passageway 24B into canister passageway 16P for discharge to fuel-vapor recovery canister 20. Such discharge will lower the pressure in upper chamber 26U until it is lesser than the pressure in lower chamber 26L and such a BOTTOM-HEAVY differential pressure will cause pressure-controlled valve 24 to move upwardly through first distance (h) to an opened position so that pressurized fuel vapor ($V_D$) can flow easily from fuel tank 18 past the opened pressure-controlled valve 24 along the first vapor flow path to fuel-vapor recovery canister 20 as shown in FIGS. 9 and 9A.

Figure 5:
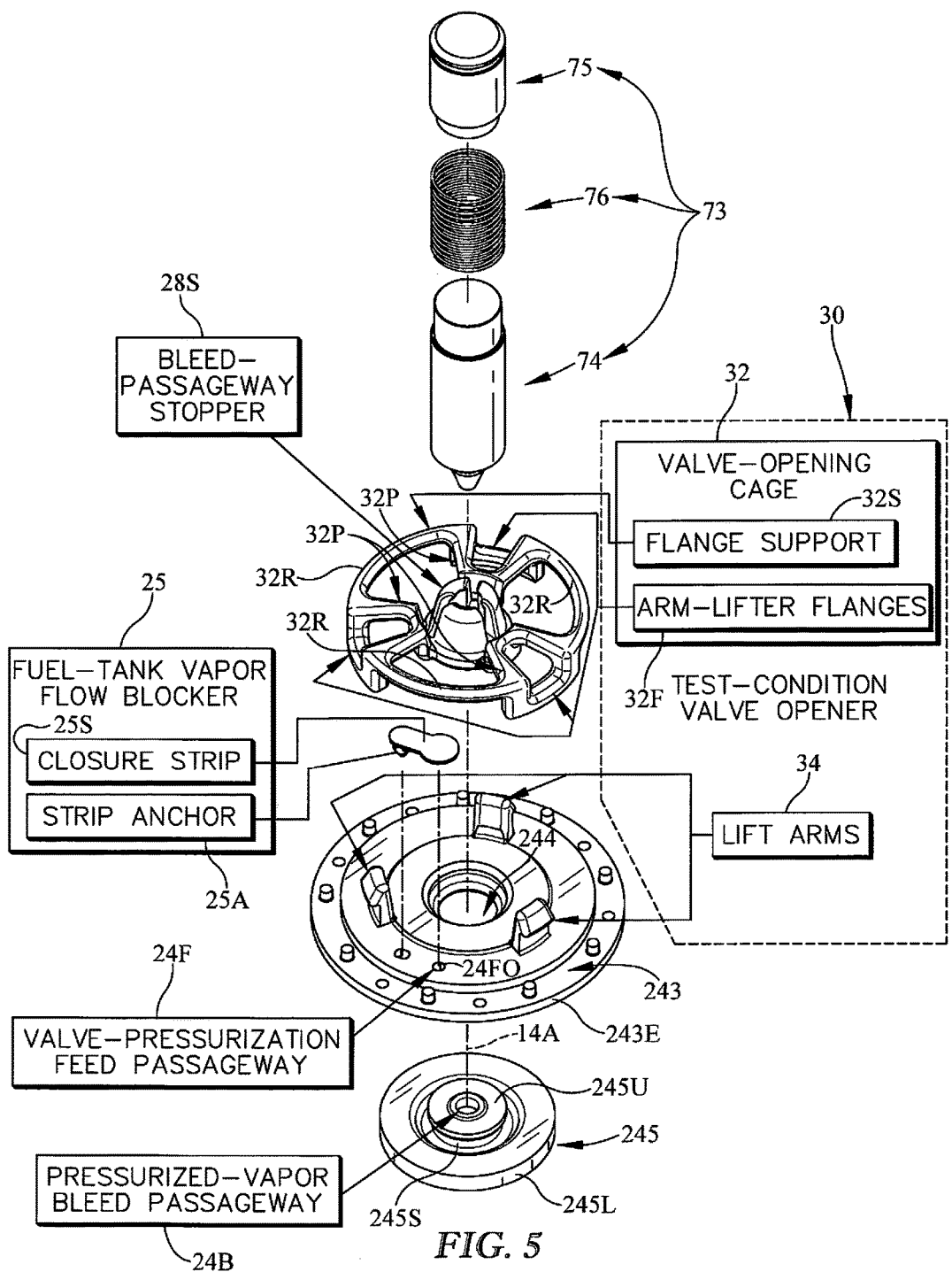
FIG. 5 is an enlarged perspective view of several of the vent apparatus components shown in FIG. 4 and showing some of the components that are included in the test-condition valve opener such as the three lift arms that are coupled to a center portion of the pressure-controlled valve and a companion valve-opening cage that is coupled to the bleed-passageway stopper of the electronic bleed controller to move up and down therewith and has three arm-lifter flanges that cooperate to be mated with the three lift arms after some relative lost motion between the arm-lifter flanges and the lift arms during upward movement of the bleed-passageway stopper from a closed position to an opened position as suggested in FIG. 10.

Pressure/vacuum valve 25 is located in upper chamber 26U and is shown, for example, in FIGS. 2-5 and 7. Valve 25 is a fuel-tank vapor flow blocker that regulates flow through valve-pressurization feed passageway 24F as suggested in FIGS. 7-10. Valve 25 includes a strip anchor 25A coupled to divider plate 243 of center portion 24C of pressure-controlled valve 24 and a pliable strip 25S cantilevered to strip anchor 25A as shown in FIG. 5. Pliable strip 25S is movable in response to pressure changes to open and close valve-pressurization feed passageway 24F. Valve 25 opens under pressure of fuel tank vapor ($V_T$) and allows that pressurized fuel vapor ($V_T$) to flow through valve-pressurized feed passageway 24F into upper chamber 26U of valve compartment 26. This allows pressure to get into upper chamber 26U above pressure-controlled valve 24 so that pressure-controlled valve 24 will remain closed until electronic bleed controller 28 moves bleed-passageway stopper 28S upwardly to open pressurized-vapor bleed passageway 24B formed in pressure-controlled valve 24. Under tank vacuum conditions in fuel tank 18, pressure/vacuum valve 25 stays closed and does not allow vacuum to reach upper chamber 26U. That keeps pressure-controlled valve 24 from opening by itself under tank vacuum conditions.

A vehicle fuel system 11 comprises a fuel tank 18, a fuel-vapor recovery canister 20, a vent apparatus 10, a first fluid-conducting conduit 10C for conducting fuel vapor between fuel tank 18 and vent apparatus 10, and a second fluid-conducting conduit 20C for conducting fuel vapor between vent apparatus 10 and fuel-vaper recovery canister 20 as suggested in FIGS. 2 and 7-9. Vent apparatus 10 is a tank venting system that comprises a valve housing 14 and a pressure-controlled valve 24 associated with valve housing 14 as suggested in FIGS. 1 and 2.

Figure 6:
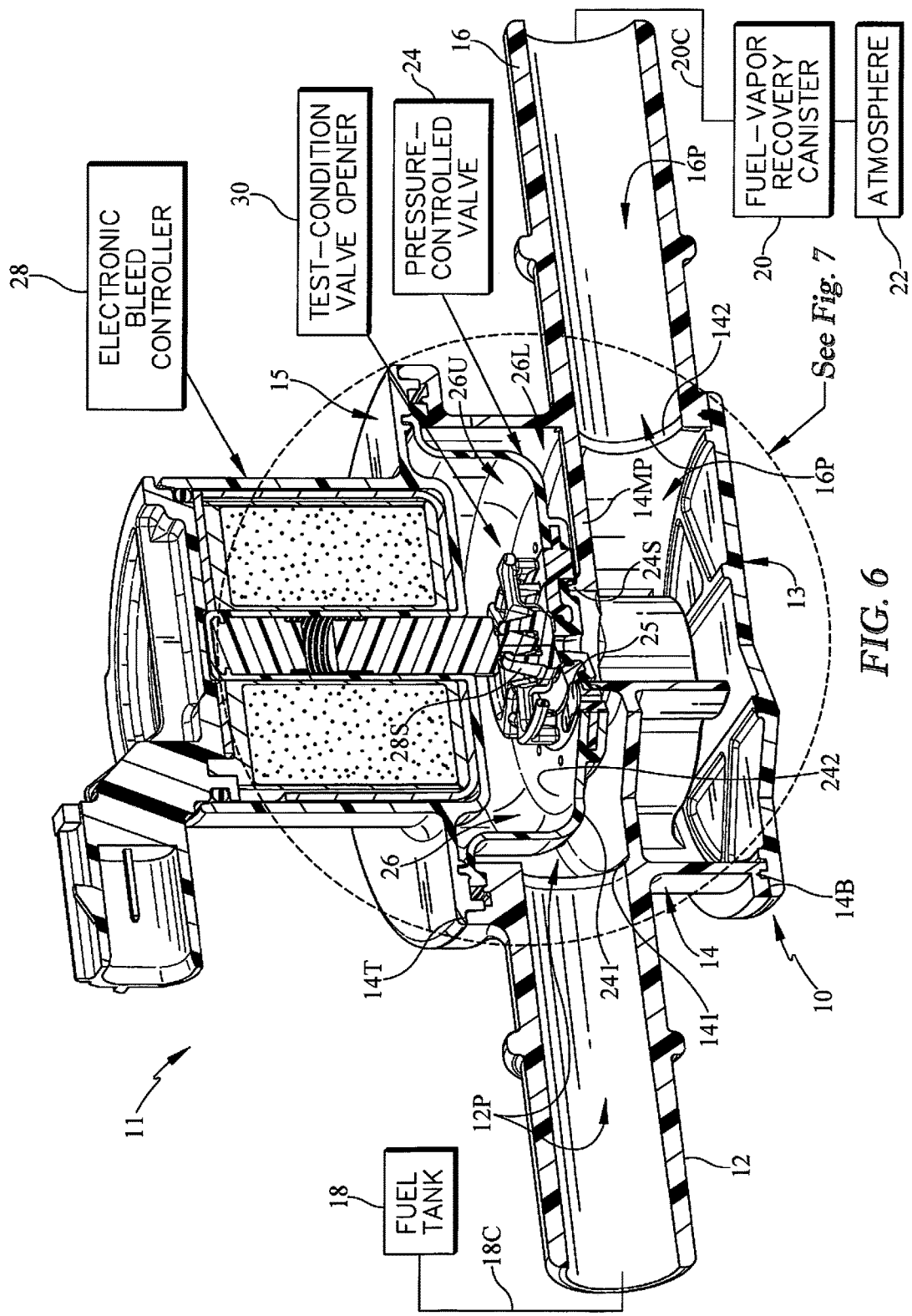
FIG. 6 is an enlarged perspective sectional view of the vent apparatus of FIG. 2 showing the pressure-controlled valve, the electronic bleed controller, and the test-condition valve opener that is linked to the electronic bleed controller.

Valve housing 14 is formed to include a tank-side inlet 141 adapted to be coupled in fluid communication to fuel tank 18 and a canister-side outlet 142 adapted to be coupled in fluid communication to fuel-vapor recovery canister 20 as suggested in FIG. 6. Valve housing 14 also is formed to include a valve seat 24S at a fluid-conducting interface 14I to intercept fluid flowing through valve housing 14 between tank-side inlet 141 and canister-side outlet 142 as suggested in FIGS. 9 and 9A.

In an illustrative embodiment, shown, for example, in FIGS. 2, 6, and 7, fuel vapor ($V_T$) is conducted between fuel tank 18 and tank-side inlet 141 of valve housing 14 via first fluid-conducting conduit 18C and tank pipe 12. Lower chamber 26U of valve compartment 26 and an interior region formed in tank pipe 12 cooperate to form tank passageway 12P as suggested in FIG. 2. Canister passageway 16P is formed by an interior region between bottom cover 13 and middle plate 14MP of valve housing 14 and an interior region formed in canister pipe 16 as suggested in FIGS. 2 and 6.

Pressure-controlled valve 24 has a first side 241 exposed to fuel vapor flowing into valve housing 14 through tank-side inlet 141 and canister-side outlet 142 and an opposite second side 242 exposed to fuel vapor extant in fuel tank 18 that is communicated to the opposite second side 242 via a valve-pressurization feed passageway 24F exposed to fuel vapor extant in fuel tank 18 as suggested in FIGS. 2 and 6. Pressure-controlled valve 24 is mounted for movement relative to valve housing 14 to a closed position shown in FIGS. 2, 6, 7, and 7A wherein the first side 241 engages valve seat 24S to block flow of fuel vapor between the tank and canister passageways 12P, 16P and an opened position wherein the first side 241 disengages valve seat 24S to allow flow of fuel vapor between the tank and canister passageways 12P, 16P as shown in FIGS. 9 and 9A.

Tank venting system 10 also comprises an electronic bleed controller 28 that is configured to provide valve-opening means for lowering pressure of fuel vapor exposed to the opposite second side 242 of pressure-controlled valve 24 by venting pressurized fuel vapor ($V_T$) that has been communicated via the valve-pressurization feed passageway 24F to the opposite second side 242 of pressure-controlled valve 24 into canister passageway 16P through a pressurized-vapor bleed passageway 24B for as pressurized vapor ($V_d$) as suggested in FIGS. 8 and 8A discharge into the atmosphere 22 in response to an electrical input. This causes pressure-controlled valve 24 to move from the closed position away from valve seat 24S to the opened position as suggested in FIGS. 9 and 9A to allow pressurized fuel vapor ($V_D$) to flow from tank passageway 12P into canister passageway 16P through the fluid-conducting interface 14I provided between tank and canister passageways 12P, 16P at valve seat 24S.

Valve housing 14 is formed to include a valve compartment 26 containing pressure-controlled valve 24 as suggested in FIGS. 2 and 6. Pressure-controlled valve 24 is arranged to divide valve compartment 26 into a lower chamber 26L bounded in part by first side 241 of pressure-controlled valve 24 and arranged to provide tank passageway 12P and a separate upper chamber 26U bounded in part by second side 242 of pressure-controlled valve 24 that is exposed to pressurized fuel vapor discharged from valve-pressurization feed passageway 24F. Pressure-controlled valve 24 is formed to include the pressurized-vapor bleed passageway 24B to allow pressurized fuel vapor ($V_d$) to flow from the separate upper chamber 26U of valve compartment 26 into canister passageway 16P for discharge into fuel-vapor recovery canister 20 when the valve-opening means 28 is activated by the electrical input to vent pressurized fuel vapor ($V_d$) from the separate upper portion 26U of valve compartment 26 through pressurized-vapor bleed passageway 24B into canister passageway 16P.

The valve-opening means 28 includes a bleed-passageway stopper 28S and a stopper mover 73 arranged to apply a force to yieldably to urge bleed-passageway stopper 28S to a bleed-blocking position engaging pressure-controlled valve 24 to block discharge of pressurized fuel vapor from the separate upper chamber 26U portion of valve compartment 26 into canister passageway 16P as suggested in FIGS. 2 and 6. The valve-opening means 28 also includes test-condition valve opener 30 means for moving bleed-passageway stopper 28S in opposition to the force applied by stopper mover from the bleed-blocking position away from pressure-controlled valve 24 to a bleed-allowing position and moving pressure-controlled valve 24 away from the closed position to hold pressure-controlled valve 24 in the opened position during a pressurized onboard diagnostics test condition as suggested in FIGS. 10 and 10A.

The test-condition valve opener means 30 includes a lift arm 34 and a valve-opening cage 32 as shown, for example, in FIGS. 3-5. Lift arm 34 is coupled to pressure-controlled valve 24 and located in the separate upper chamber 26U of valve compartment 26 as shown in FIGS. 9 and 9A. Valve-opening cage 32 is coupled to bleed-passageway stopper 28S to move therewith as suggested in FIG. 5. Valve-opening cage 32 includes a separate arm-lifter flange 32F for each of the lift arms 34 and a ring-shaped flange support 32S that is coupled to each of the circumferentially spaced-apart arm-lifter flanges 32F and anchored to bleed-passageway stopper 28S as shown in FIG. 5. Valve-opening cage 32 is arranged to cause each arm-lifter flange 32F to engage and move a companion lift arm 34 relative to valve housing 14 following movement of bleed-passageway stopper 28S away from bleed-blocking position to a bleed-allowing position to cause pressure-controlled valve 24 to move to and be supported in an opened position during the pressurized onboard diagnostics test condition as suggested in FIGS. 10 and 10A. As shown in FIG. 5, flange support 32S comprises three radially extending and circumferentially spaced-apart flange-support posts 32P. Each post 32P is arranged to interconnect bleed-passageway stopper 28S and one of the arm-lifter flanges 32F. Flange support 32S also comprises three arc-shaped rims 32R and each rim 32R interconnects a pair of adjacent arm-lifter flanges 32F.

Pressure-controlled valve 24 includes a center portion 24C that is arranged to engage the underlying valve seat 24S when pressure-controlled valve 24 is in the closed position as shown in FIGS. 2 and 6. Center portion 24C is formed to include the pressurized-vapor bleed passageway 24B as shown in FIG. 4. Center portion is also formed to include the valve-pressurization feed passageway 24F as shown in FIG. 4.

Pressure-controlled valve 24 further includes a rim portion 24R coupled to valve-housing 14 and a web portion 24W arranged to interconnect center portion 24C and rim portion 24R as suggested in FIG. 4. Web portion 24W is arranged to support center portion 24C for movement relative to valve seat 24S to engage valve seat 24S and align pressurized-vapor bleed passageway 24B in fluid communication with canister passageway 16P in the closed position of pressure-controlled valve 24 as shown in FIGS. 7, 7A, 8, and 8A and disengage valve seat 24S in the opened position of pressure-controlled valve 24 as shown in FIGS. 9, 9A, 10, and 10A.

Center portion 24C comprises a divider plate 243 having a peripheral edge 243E coupled to web portion 24W as suggested in FIG. 7A. Divider plate 243 is formed to include a seal-receiving aperture 244 opening into the separate upper chamber 26U of valve compartment 26 and into canister passageway 16P when pressure-controlled valve 24 is in the closed position as suggested in FIGS. 7 and 7A. Center portion 24C also includes a seal ring 245 formed to include the pressurized-vapor bleed aperture 24B and arranged to extend through the seal-receiving aperture 244 and remain coupled to divider plate 243 to move therewith during movement of pressure-controlled valve 24 between the closed and opened positions as suggested in FIGS. 7-9. Seal ring 245 includes a lower flange 245L and an upper flange 245U as shown in FIG. 5. Lower flange 245L is arranged to lie between valve seat 24S and divider plate 243 to establish a sealed connection therebetween when pressure-controlled valve 24 is in the closed position as suggested in FIGS. 7-9. Upper flange 245U is arranged to mate with the valve-opening means 28 to establish a sealed connection therebetween when the valve-opening means 28 is arranged to block flow of pressurized fuel vapor from upper chamber 26U of valve compartment 26 through pressurized-vapor bleed passageway 24B into canister passageway 16P. Divider plate 243 is formed to include the valve-pressurization feed passageway 24F in a location between 24W web portion and seal ring 245 as suggested in FIGS. 4 and 5.

Valve housing 14 is formed to include a valve compartment 26 containing pressure-controlled valve 24 as suggested in FIGS. 2 and 6. Pressure-controlled valve 24 is arranged to divide valve compartment 26 into a lower chamber 26L bounded in part by first side 241 of pressure-controlled valve 24 and a separate upper chamber 26U bounded in part by second side 241 of pressure-controlled valve 24. Lower chamber 26L is arranged to communicate with tank passageway 12P when pressure-controlled valve 24 is in the closed and opened positions as suggest in FIGS. 6-10 and with canister passageway 16P when pressure-controlled valve 24 is in the opened position as suggested in FIGS. 9 and 10.

Pressure-controlled valve 24 is formed to include the valve-pressurization feed passageway 24F to conduct pressurized fuel vapor from tank passageway 12P to the separate upper chamber 26U of valve compartment 26 to supply pressurized fuel vapor from fuel tank 18 to the opposite second side 241 of pressure-controlled valve 24 as suggested in FIG. 7. Valve-pressurization feed passageway 24F has a first opening in first side 241 of pressure-controlled valve 24 and an opposite second opening in second side 242 of pressure-controlled valve 24 as suggested in FIGS. 2, 7, and 7A.

Pressure-controlled valve 24 is also formed to include the pressurized-vapor bleed passageway 24B to allow pressurized fuel vapor ($V_d$) to flow from the separate upper chamber 26U of valve compartment 26 into canister passageway 16P for discharge into fuel-vapor recovery canister 20 when the valve-opening means 28 is actuated by the electrical input as suggested in FIGS. 8 and 8A. This causes pressurized fuel vapor ($V_d$) to vent from the separate upper chamber 26U of valve compartment 26 through pressurized-vapor bleed passageway 24B into canister passageway 16P.

Divider plate 243 is made of a plastics material and formed to include valve-pressurization feed passageway 24F as shown, for example, in FIG. 4. Seal ring 245 is coupled to divider plate 243 to move therewith and formed to include pressurized-vapor bleed passageway 24B as suggest in FIGS. 2 and 3. Seal ring 245 is arranged to mate with valve seat 24S upon movement of pressure-controlled valve 24 to the closed position as suggested in FIGS. 7 and 7A. Web portion 24W is a pliable diaphragm having a radially inner portion coupled to a peripheral portion of divider plate 243 and a radially outer portion coupled to rim portion 24R to support pressure-controlled valve 24 for movement in valve compartment 26 relative to valve housing 14 between the closed and opened positions.

Pressurized-vapor bleed passageway 24B is arranged to conduct fuel vapor between canister passageway 16P and upper chamber 26U of valve compartment 26 when pressure-controlled valve 24 is in the closed position. Valve-pressurization feed passageway 24F is arranged to conduct fuel vapor between tank passageway 12P and upper chamber 26U of valve compartment 26 when pressure-controlled valve 24 is in the closed position.

Bleed-passageway stopper 28S is located in the separate upper chamber 26U of valve compartment 26 for up-and-down movement relative to center portion 24C of pressure-controlled valve 24 between a bleed-blocking position shown in FIGS. 6 and 7 engaging center portion 24C to block discharge of pressurized fuel vapor from the separate upper chamber 26U of valve compartment 26 into canister passageway 16P through pressurized-vapor bleed passageway 24B and a bleed-allowing position shown in FIGS. 8 and 9 disengaging center portion 24C to allow discharge of pressurized fuel vapor from the separate upper chamber 26U of valve compartment 26 into canister passageway 16P. Such fuel vapor discharge lowers pressure of fuel vapor exposed to the opposite second side 242 of pressure-controlled valve 24 to a level that is below the level of pressure of pressurized fuel vapor in lower chamber 26L of valve compartment 26 that is applied to first side 241 of pressure-controlled valve 24 so that pressure-controlled valve 24 is moved from the closed position to an opened position to allow pressurized fuel vapor ($V_T$) extant in tank passageway 12P to flow into canister passageway 16P through the fluid-conducting interface 14I provided between fuel and canister passageways 12P, 16P.

Valve seat 24S is ring-shaped and extends around a vertical central axis as shown in FIG. 4. Bleed-passageway stopper 28S is arranged to be moved up and down relative to center portion 24C of pressure-controlled valve 24 along a vertical stopper-motion axis that is coextensive with vertical central axis 14A as suggested in FIGS. 3 and 8-10.

Divider plate 243 arranged to lie above valve seat 24S and formed to include a seal-receiving aperture 244 opening into lower chamber 16L of valve compartment 26 and into canister passageway 16P. Seal ring 245 is arranged to extend through the seal-receiving aperture 244 and formed to include the pressurized-vapor bleed aperture 24B.

Seal ring 245 includes a sleeve 245S, a lower flange 245L, and an upper flange 245U as shown in FIG. 5. Sleeve 245S is formed to define pressurized-vapor bleed passageway 24B and arranged to extend through the seal-receiving 244 aperture formed in divider plate 243. Lower flange 245L is coupled to a lower end of sleeve 245S and arranged to mate with valve seat 24S to establish a sealed connection therebetween to block flow of pressurized fuel vapor ($V_T$) between the tank and canister passageways 12P, 16P when pressure-controlled valve 24 is in the closed position.

Upper flange 245U is coupled to an opposite upper end of sleeve 245S to face into the separate upper portion 26U of valve compartment 26. Upper flange 245U is arranged to mate with the valve-opening means 28 to establish a sealed connection therebetween to block flow of pressurized fuel vapor ($V_d$) from the separate upper chamber 26U of valve compartment 26 through pressurized-vapor bleed passageway 24B into canister passageway 16P until the valve-opening means 28 is actuated by the electrical input.

The valve-opening means is provided by an electronic bleed controller 28 associated with pressure-controlled valve 24 and arranged to lie normally in a flow-blocking position to block flow of pressurized fuel vapor from valve-pressurization feed passageway 24F to canister passageway 16P through pressurized-vapor bleed passageway 24B. Electronic bleed controller 28 is arranged to move from the flow-blocking position shown in FIGS. 7 and 7A to a flow-allowing position shown in FIGS. 8 and 8A to allow flow of pressurized fuel vapor ($V_d$) from valve-pressurization feed passageway 24F to the canister passageway 16P through pressurized-vapor bleed passageway 24B to lower pressure of pressurized fuel vapor exposed to the opposite second side 242 of pressure-controlled valve 24 in response to the electrical input to cause pressure-controlled valve 24 to move from the closed position shown in FIGS. 8 and 8A away from valve seat 24S to the opened position shown in FIGS. 9 and 9A to allow pressurized fuel vapor to flow from tank passageway 12P into canister passageway 16P.

Valve-pressurization feed passageway 24F has an inlet 24FI formed in first side 241 of pressure-controlled valve 24 to receive pressurized fuel vapor discharged from tank passageway 12P and an outlet 24FO formed in the opposite second side 242 of pressure-controlled valve 24 to communicate pressurized fuel vapor to the opposite second side 242 as suggested in FIGS. 7 and 7A. Valve-pressurization feed passageway 24F is arranged to lie in spaced-apart relation to pressurized-vapor bleed aperture 24B as suggested in FIG. 7A.

Pressure-controlled valve 24 includes a perimeter rim 24R coupled to valve housing 14, a center portion 24C arranged to lie in confronting relation to valve seat 24S of valve housing 14 and formed to include the valve-pressurization feed passageway 24F and the pressurized-vapor bleed aperture 244, and a web portion 24W as suggested in FIG. 4. Web portion 24W is arranged to interconnect center portion 24C and perimeter rim 24R as suggested in FIG. 7. Web portion 24W is arranged to support center portion 24C for movement relative to valve seat 24S to engage valve seat 24S and align the pressurized-vapor bleed aperture 24B in fluid communication with canister passageway 16P in the closed position of pressure-controlled valve 24 as suggested in FIG. 7A and disengage valve seat 24S in the opened position of pressure-controlled valve 24 as suggested in FIG. 8A.

Valve housing 14 includes a body 10B including valve seat 24S, a tank pipe 12 that is formed to include a portion of the tank passageway 12P, and a canister pipe 16 that is formed to include a portion of the canister passageway 16P as suggested in FIG. 3. Valve housing 14 also includes a cap 15 coupled to body 10B to form a valve compartment 26 containing pressure-controlled valve 24 to allow movement of pressure-controlled valve 24 between the closed and opened positions as suggested in FIGS. 7 and 9. Pressure-controlled valve 24 is arranged to divide valve compartment 26 into a lower chamber 26L bounded in part by first side of pressure-controlled valve 24 and a separate upper chamber 26U bounded in part by the opposite second side 242 of pressure-controlled valve 24. Valve-pressurization feed passageway 24F is formed in pressure-controlled valve 24 to communicate with upper chamber 26U of valve compartment 26. An inlet end of pressurized-vapor bleed passageway 24B is arranged to communicate with upper chamber 26U of valve compartment 26. An outlet end of pressurized-vapor bleed passageway 24B is arranged to communicate with canister passageway 16P.

Valve-opening means 28 includes a bleed-passageway stopper 28S that is located in upper chamber 26U of valve compartment 26. Bleed-passageway stopper 28S is aligned to lie in close proximity to the inlet end of pressurized-vapor bleed passageway 24B formed in pressure-controlled valve 24 and move relative to pressure-controlled valve 24 during movement of the electronically controlled electronic bleed controller 28 between the flow-allowing and flow-blocking positions to regulate flow of pressurized fuel vapor from upper portion 26U of valve compartment 26 to canister passageway 16P via the pressurized-vapor bleed passageway 24B.

Pressure-controlled valve 24 is arranged to lie between the electronically controlled pressure-bleed valve 28 and valve seat 24S included in valve housing 14 as shown in FIG. 2. Valve compartment 26 contains the pressure-controlled valve 24 and interconnects valve-pressurization feed passageway 24F and pressurized-vapor bleed passageway 24B in fluid communication. Upper chamber 26U arranged to communicate pressurized fuel vapor from valve-pressurization feed passageway 24L to pressurized-vapor bleed passageway 24B.

A tank venting system 18C, 10, 20C is provided to control flow of air and fuel vapor between a fuel tank 18 and an emission control system including a fuel-vapor recovery canister 20 as suggested in FIG. 2. Tank venting system 18C, 10, 20C is used onboard a vehicle (not shown) including an engine and a purge vacuum source coupled to engine and canister 20.

Both pressure-controlled valve 24 and bleed-passageway stopper 28S are controlled by electronic bleed controller 28. Pressure-controlled valve 24 is configured to selectively allow a relatively large volume of fuel vapor to flow from tank 12 to canister 20 to relieve unwanted tank pressure conditions as suggested in FIG. 9. Bleed-passageway stopper 28S is configured to selectively allow a relatively small volume of fuel vapor ($V_d$) to flow to atmosphere 22 via canister 20 and thereby control pressures applied to pressure-controlled valve 24 as suggested in FIGS. 8 and 9.

Electronic bleed controller 28 is an actuator that is directly coupled to bleed-passageway stopper 28S and indirectly coupled to pressure-controlled valve 24 via a lost-motion connector provided by test-condition valve opener 30 as shown in FIGS. 10 and 10A. Direct connection of actuator 28 with stopper 28S and indirect connection of actuator 28 with pressure-controlled valve 24 causes stopper 28S to be opened ahead of pressure-controlled valve 24 so that pressures applied to pressure-controlled valve 24 assist actuator 28 in opening pressure-controlled valve 24. By adjusting pressures applied to the pressure-controlled valve 24, stopper 28S can reduce force needed to move the pressure-controlled valve 24 to the opened position. Accordingly, the power required to control flow through tank venting system 18C, 10, 20C is less than if controlling a relatively-large volume flow valve with only a directly connected electronic actuator.

In the illustrated embodiment, tank pipe 12 extends directly from lower chamber 26L and canister pipe 16 extends directly from upper chamber 26U such that tank pipe 12 and canister pipe 16 are offset from one another and pressure losses incurred during movement of fluid from pipes 12, 16 into/out of valve-receiving space 26 are minimized.

Illustrative components included in vent apparatus 10 are shown in FIG. 3. A top housing cover 15 is ultrasonically welded to a top side 14T of valve housing 14 of body 10B and a bottom housing cover 15 is ultrasonically welded to a bottom side 14B of valve housing 14. An assembly 80 comprising a lid 81, an O-ring 82, a plate 83, a can 24, and an electronic bleed controller 28 comprising a coil assembly 72 and a stopper mover 73 mounted for movement in a vertical passageway 72P formed in coil assembly 72 is shown in FIG. 3. Stopper mover 73 comprises a rod 75, a mover past 74 coupled to bleed-passageway stopper 28S, and a coiled compression spring 76 interposed between and in contact with rod 75 and mover post 74.

Electronic bleed controller 28 is configured to be electronically controlled by a controller actuator 70 as suggested in FIG. 1. Electronic bleed controller 28 includes a coil assembly 72, a mover post 74, and a bias spring 76 as shown in FIGS. 1 and 2. Coil assembly 72 is configured to be energized by controller actuator 70 to retract mover post 74. Mover post 74 is mounted for movement within coil assembly 72 for movement between an extended and a retracted position. Mover post 74 is coupled directly to bleed-passageway stopper 28S and indirectly to pressure-controlled valve 24 via lost-motion coupler 30 such that retraction of mover post 74 opens, first bleed-passageway stopper 28S as suggested in FIGS. 8 and 8A and then pressure-controlled valve 24 as suggested in FIGS. 10 and 10A. Bias spring 76 biases mover post 74 toward the extended position.

In illustrative embodiments, vacuum-relief valve 38 and pressure-relief valve 30 are incorporated into vent apparatus 10 to accommodate fault modes of the vent apparatus 10. Vacuum-relief valve 38 is configured to allow vapor to flow from canister 20 (and atmosphere 22) to tank 12 upon a large enough vacuum pressure developing in tank 12. Pressure-relief valve 36 is configured to allow vapor to flow from tank 12 to canister 20 (and atmosphere) upon a large enough pressure developing in tank 12.

In operation, to open the pressure-controlled valve 24 thereby allowing a relatively large flow of fuel vapor to move from tank 12 to canister 20, an electrical signal is generated by controller actuator 70 associated with opening of bleed-passageway stopper 28S. The electrical signal may be generated in response to a user opening an outer fuel door of a vehicle indicative that the use may be about to refuel the vehicle. Upon receipt of the electrical signal, electronic bleed controller 28 begins to retract bleed-passageway stopper 28S to allow a relatively small flow of fuel vapor ($V_d$) from upper chamber 26U of valve-receiving space 26 toward canister 20 and atmosphere 22 as suggested in FIGS. 8 and 8A.

The relatively small flow of fuel vapor ($V_d$) changes the pressure applied to pressure-controlled valve 24 to make the pressure-controlled valve 24 easier to open because of differential pressure applied to the deformable diaphragm 24W. As bleed-passageway stopper 28S continues to retract, the lost-motion connector 30 is engaged and the pressure-controlled valve 24 is opened during a test condition.

Vent apparatus 10 provides a fuel management isolation valve system in which the pressure feed 24F and pressure bleed 24B are located in the pressure-controlled valve 24 and electronic bleed controller 28 engages and retracts or pulls open a diaphragm seal established by pressure-controlled valve 24. A one millimeter feed orifice 24F is formed in pressure-controlled valve 24 outside of the main seal area in contact with valve seat 24S. A bleed orifice 24B is now at the center of pressure-controlled valve 24 and is sealed by a bleed-passageway stopper 28S coupled to electronic bleed controller 28. When the coil is energized the armature 73 will move about 0.5 millimeter to move stopper 28S to open bleed orifice 24B and begin to decay the pressure on top of pressure-controlled valve 24 in upper chamber 26U. As this occurs, pressure-controlled valve 24 will begin to blow open on its own and the armature continues to pull in to the coil core until the pressure-controlled valve 24 is full open. The pressure-controlled valve 24 is then held open by armature/cage connections until the coil is allowed to de-energize. Pressure-controlled valve 24 opens on its own in this way and the bleed size is minimized. Therefore a smaller coil is required in this design to initiate bleed of pressure from upper chamber 26 and to hold pressure-controlled valve 24 open under OBDII pressure-testing conditions.

The invention claimed is:

1. A tank venting system comprising
a valve housing formed to include a tank passageway having a tank-side inlet adapted to be coupled in fluid communication to a fuel tank and a canister passageway having a canister-side outlet adapted to be coupled in fluid communication to a fuel-vapor recovery canister, the valve housing also being formed to include a valve seat at a fluid-conducting interface to intercept fluid flowing through the valve housing between the tank-side inlet and canister-side outlet,
a pressure-controlled valve having a first side exposed to fuel vapor flowing into the valve housing through the tank-side inlet and the canister-side outlet and an opposite second side exposed to fuel vapor extant in the fuel tank that is communicated to the opposite second side via a valve-pressurization feed passageway exposed to fuel vapor extant in the fuel tank, the pressure-controlled valve being mounted for movement relative to the valve housing to a closed position wherein the first side engages the valve seat to block flow of fuel vapor between the tank and canister passageways and an opened position wherein the first side disengages the valve seat to allow flow of fuel vapor between the tank and canister passageways, and a valve opener configured to selectively lower pressure of fuel vapor exposed to the opposite second side of the pressure-controlled valve by venting pressurized fuel vapor that has been communicated via the valve-pressurization feed passageway to the opposite second side of the pressure-controlled valve into the canister passageway through a pressurized-vapor bleed passageway for discharge into the atmosphere in response to an electrical input so that the pressure-controlled valve moves from the closed position away from the valve seat to the opened position to allow pressurized fuel vapor to flow from the tank passageway into the canister passageway through the fluid-conducting interface provided between the tank and canister passageways at the valve seat, wherein the valve housing is formed to include a valve compartment containing the pressure-controlled valve, the pressure-controlled valve is arranged to divide the valve compartment into a lower chamber bounded in part by the first side of the pressure-controlled valve and arranged to provide the tank passageway and a separate upper chamber bounded in part by the second side of the pressure-controlled valve that is exposed to pressurized fuel vapor discharged from the valve-pressurization feed passageway, and the pressure-controlled valve is formed to include the pressurized-vapor bleed passageway to allow pressurized fuel vapor to flow from the separate upper chamber of the valve compartment into the canister passageway for discharge into the fuel-vapor recovery canister when the valve opener is activated by the electrical input to vent pressurized fuel vapor from the separate upper chamber of the valve compartment through the pressurized-vapor bleed passageway into the canister passageway, and wherein the valve opener includes a bleed-passageway stopper, a stopper mover arranged to apply a force to yieldably to urge the bleed-passageway stopper to a bleed-blocking position engaging the pressure-controlled valve to block discharge of pressurized fuel vapor from the separate upper chamber of the valve compartment into the canister passageway, and a test-condition valve opener configured to move the bleed-passageway stopper in opposition to the force applied by the stopper mover from the bleed-blocking position away from the pressure-controlled valve to a bleed-allowing position and moving the pressure-controlled valve away from the closed position to hold the pressure-controlled valve in the opened position during a pressurized onboard diagnostics test condition.

2. The tank venting system of claim 1, wherein the test-condition valve opener includes a lift arm coupled to the pressure-controlled valve and located in the separate upper chamber of the valve compartment and a valve-opening cage coupled to the bleed-passageway stopper to move therewith and arranged to engage and move the lift arm relative to the valve housing following movement of the bleed-passageway stopper away from bleed-blocking position to a bleed-allowing position to cause the pressure-controlled valve to move to and be supported in an opened position during the pressurized onboard diagnostics test condition.

3. A tank venting system comprising
a valve housing formed to include a tank passageway having a tank-side inlet adapted to be coupled in fluid communication to a fuel tank and a canister passageway having a canister-side outlet adapted to be coupled in fluid communication to a fuel-vapor recovery canister, the valve housing also being formed to include a valve seat at a fluid-conducting interface to intercept fluid flowing through the valve housing between the tank-side inlet and canister-side outlet, a pressure-controlled valve having a first side exposed to fuel vapor flowing into the valve housing through the tank-side inlet and the canister-side outlet and an opposite second side exposed to fuel vapor extant in the fuel tank that is communicated to the opposite second side via a valve-pressurization feed passageway exposed to fuel vapor extant in the fuel tank, the pressure-controlled valve being mounted for movement relative to the valve housing to a closed position wherein the first side engages the valve seat to block flow of fuel vapor between the tank and canister passageways and an opened position wherein the first side disengages the valve seat to allow flow of fuel vapor between the tank and canister passageways, and a valve opener configured to selectively lower pressure of fuel vapor exposed to the opposite second side of the pressure-controlled valve by venting pressurized fuel vapor that has been communicated via the valve-pressurization feed passageway to the opposite second side of the pressure-controlled valve into the canister passageway through a pressurized-vapor bleed passageway for discharge into the atmosphere in response to an electrical input so that the pressure-controlled valve moves from the closed position away from the valve seat to the opened position to allow pressurized fuel vapor to flow from the tank passageway into the canister passageway through the fluid-conducting interface provided between the tank and canister passageways at the valve seat, wherein the valve housing is formed to include a valve compartment containing the pressure-controlled valve, the pressure-controlled valve is arranged to divide the valve compartment into a lower chamber bounded in part by the first side of the pressure-controlled valve and arranged to provide the tank passageway and a separate upper chamber bounded in part by the second side of the pressure-controlled valve that is exposed to pressurized fuel vapor discharged from the valve-pressurization feed passageway, and the pressure-controlled valve is formed to include the pressurized-vapor bleed passageway to allow pressurized fuel vapor to flow from the separate upper chamber of the valve compartment into the canister passageway for discharge into the fuel-vapor recovery canister when the valve opener is activated by the electrical input to vent pressurized fuel vapor from the separate upper chamber of the valve compartment through the pressurized-vapor bleed passageway into the canister passageway, wherein the pressure-controlled valve includes a center portion that is arranged to engage the valve seat when the pressure-controlled valve is in the closed position and formed to include the pressurized-vapor bleed passageway and a web portion connected to the center portion, and wherein the center portion comprises a divider plate having a peripheral edge coupled to the web portion and being formed to include a seal-receiving aperture opening into the separate upper chamber of the valve compartment and into the canister passageway when the pressure-controlled valve is in the closed position, a seal ring formed to include the pressurized-vapor bleed passageway and arranged to extend through the seal-receiving aperture and remain coupled to the divider plate to move therewith during movement of the pressure-controlled valve between the closed and opened positions, and the seal ring includes a lower flange arranged to lie between the valve seat and the divider plate to establish a sealed connection therebetween when the pressure-controlled valve is in the closed position and an upper flange arranged to mate with the valve opener to establish a sealed connection therebetween when the valve opener is arranged to block flow of pressurized fuel vapor from the upper chamber of the valve compartment through the pressurized-vapor bleed passageway into the canister passageway.

4. The tank venting system of claim 3, wherein the divider plate is formed to include the valve-pressurization feed passageway in a location between the web portion and the seal ring.

5. A tank venting system comprising
a valve housing formed to include a tank passageway having a tank-side inlet adapted to be coupled in fluid communication to a fuel tank and a canister passageway having a canister-side outlet adapted to be coupled in fluid communication to a fuel-vapor recovery canister, the valve housing also being formed to include a valve seat at a fluid-conducting interface to intercept fluid flowing through the valve housing between the tank-side inlet and canister-side outlet,
a pressure-controlled valve having a first side exposed to fuel vapor flowing into the valve housing through the tank-side inlet and the canister-side outlet and an opposite second side exposed to fuel vapor extant in the fuel tank that is communicated to the opposite second side via a valve-pressurization feed passageway exposed to fuel vapor extant in the fuel tank, the pressure-controlled valve being mounted for movement relative to the valve housing to a closed position wherein the first side engages the valve seat to block flow of fuel vapor between the tank and canister passageways and an opened position wherein the first side disengages the valve seat to allow flow of fuel vapor between the tank and canister passageways, and
a valve opener configured to selectively lower pressure of fuel vapor exposed to the opposite second side of the pressure-controlled valve by venting pressurized fuel vapor that has been communicated via the valve-pressurization feed passageway to the opposite second side of the pressure-controlled valve into the canister passageway through a pressurized-vapor bleed passageway for discharge into the atmosphere in response to an electrical input so that the pressure-controlled valve moves from the closed position away from the valve seat to the opened position to allow pressurized fuel vapor to flow from the tank passageway into the canister passageway through the fluid-conducting interface provided between the tank and canister passageways at the valve seat,
wherein the valve housing is formed to include a valve compartment containing the pressure-controlled valve, the pressure-controlled valve is arranged to divide the valve compartment into a lower chamber bounded in part by the first side of the pressure-controlled valve and arranged to communicate with the tank passageway when the pressure-controlled valve is in the closed and opened positions and with the canister passageway when the pressure-controlled valve is in the opened position and a separate upper chamber bounded in part by the second side of the pressure-controlled valve, and the pressure-controlled valve is formed to include the valve-pressurization feed passageway to conduct pressurized fuel vapor from the tank passageway to the separate upper chamber of the valve compartment to supply pressurized fuel vapor from the fuel tank to the opposite second side of the pressure-controlled valve,
wherein the pressure-controlled valve is formed to include the pressurized-vapor bleed passageway to allow pressurized fuel vapor to flow from the separate upper chamber of the valve compartment into the canister passageway for discharge into the fuel-vapor recovery canister when the valve opener is actuated by the electrical input to vent pressurized fuel vapor from the separate upper chamber of the valve compartment through the pressurized-vapor bleed passageway into the canister passageway, and
wherein the valve opener includes a bleed-passageway stopper, a stopper mover arranged to apply a force to yieldably to urge the bleed-passageway stopper to a bleed-blocking position engaging the pressure-controlled valve to block discharge of pressurized fuel vapor from the separate upper chamber of the valve compartment into the canister passageway, and a test-condition valve opener configured to move the bleed-passageway stopper in opposition to the force applied by the stopper mover from the bleed-blocking position away from the pressure-controlled valve to a bleed-allowing position and moving the pressure-controlled valve away from the closed position to hold the pressure-controlled valve in the opened position during a pressurized onboard diagnostics test condition.

6. The tank venting system of claim 5, wherein the test-condition valve-opener includes a lift arm coupled to the pressure-controlled valve and located in the separate upper chamber of the valve compartment and a valve-opening cage coupled to the bleed-passageway stopper to move therewith and arranged to engage and move the lift arm relative to the valve housing following movement of the bleed-passageway stopper away from bleed-blocking position to a bleed-allowing position to cause the pressure-controlled valve to move to and be supported in an opened position during the pressurized onboard diagnostics test condition.

7. The tank venting system of claim 6, wherein the bleed-passageway stopper is located in the separate upper chamber of the valve compartment for up-and-down movement relative to the center portion of the pressure-controlled valve between a bleed-blocking position engaging the center portion to block discharge of pressurized fuel vapor from the separate upper chamber of the valve compartment into the canister passageway through the pressurized-vapor bleed passageway and a bleed-allowing position disengaging the center portion to allow discharge of pressurized fuel vapor from the separate upper chamber of the valve compartment into the canister passageway to lower pressure of fuel vapor exposed to the opposite second side of the pressure-controlled valve to a level that is below the level of pressure of pressurized fuel vapor in the lower chamber of the valve compartment that is applied to the first side of the pressure-controlled valve so that the pressure-controlled valve is moved from the closed position to an opened position to allow pressurized fuel vapor extant in the tank passageway to flow into the canister passageway through the fluid-conducting interface provided between the fuel and canister passageways.

8. The tank venting system of claim 7, wherein the valve seat is ring-shaped and extends around a vertical central axis and the bleed-passageway stopper is arranged to be moved up and down relative to the center portion of the pressure-controlled valve along a vertical stopper-motion axis that is coextensive with the vertical central axis.

9. A tank venting system comprising
a valve housing formed to include a tank passageway having a tank-side inlet adapted to be coupled in fluid communication to a fuel tank and a canister passageway having a canister-side outlet adapted to be coupled in fluid communication to a fuel-vapor recovery canister, the valve housing also being formed to include a valve seat at a fluid-conducting interface to intercept fluid flowing through the valve housing between the tank-side inlet and canister-side outlet,
a pressure-controlled valve having a first side exposed to fuel vapor flowing into the valve housing through the tank-side inlet and the canister-side outlet and an opposite second side exposed to fuel vapor extant in the fuel tank that is communicated to the opposite second side via a valve-pressurization feed passageway exposed to fuel vapor extant in the fuel tank, the pressure-controlled valve being mounted for movement relative to the valve housing to a closed position wherein the first side engages the valve seat to block flow of fuel vapor between the tank and canister passageways and an opened position wherein the first side disengages the valve seat to allow flow of fuel vapor between the tank and canister passageways, and
a valve opener configured to selectively lower pressure of fuel vapor exposed to the opposite second side of the pressure-controlled valve by venting pressurized fuel vapor that has been communicated via the valve-pressurization feed passageway to the opposite second side of the pressure-controlled valve into the canister passageway through a pressurized-vapor bleed passageway for discharge into the atmosphere in response to an electrical input so that the pressure-controlled valve moves from the closed position away from the valve seat to the opened position to allow pressurized fuel vapor to flow from the tank passageway into the canister passageway through the fluid-conducting interface provided between the tank and canister passageways at the valve seat,
wherein the valve housing is formed to include a valve compartment containing the pressure-controlled valve, the pressure-controlled valve is arranged to divide the valve compartment into a lower chamber bounded in part by the first side of the pressure-controlled valve and arranged to communicate with the tank passageway when the pressure-controlled valve is in the closed and opened positions and with the canister passageway when the pressure-controlled valve is in the opened position and a separate upper chamber bounded in part by the second side of the pressure-controlled valve, and the pressure-controlled valve is formed to include the valve-pressurization feed passageway to conduct pressurized fuel vapor from the tank passageway to the separate upper chamber of the valve compartment to supply pressurized fuel vapor from the fuel tank to the opposite second side of the pressure-controlled valve,
wherein the pressure-controlled valve is formed to include the pressurized-vapor bleed passageway to allow pressurized fuel vapor to flow from the separate upper chamber of the valve compartment into the canister passageway for discharge into the fuel-vapor recovery canister when the valve opener is actuated by the electrical input to vent pressurized fuel vapor from the separate upper chamber of the valve compartment through the pressurized-vapor bleed passageway into the canister passageway,
wherein the pressure-controlled valve includes a divider plate arranged to lie above the valve seat and formed to include a seal-receiving aperture opening into the lower chamber of the valve compartment and into the canister passageway and a seal ring arranged to extend through the seal-receiving aperture and formed to include the pressurized vapor bleed passageway, and
wherein the seal ring includes a sleeve formed to define the pressurized-vapor bleed passageway and arranged to extend through the seal-receiving aperture formed in the divider plate and a lower flange coupled to a lower end of the sleeve and arranged to mate with the valve seat to establish a sealed connection therebetween to block flow of fuel vapor between the tank and canister passageways when the pressure-controlled valve is in the closed position.

10. The tank venting system of claim 9, wherein the seal ring further includes an upper flange coupled to an opposite upper end of the sleeve to face into the separate upper portion of the valve compartment and arranged to mate with the valve opener to establish a sealed connection therebetween to block flow of pressurized fuel vapor from the separate upper chamber of the valve compartment through the pressurized-vapor bleed passageway into the canister passageway until the valve opener is actuated by the electrical input.

11. A tank venting system comprising
a valve housing formed to include a tank passageway having a tank-side inlet adapted to be coupled in fluid communication to a fuel tank and a canister passageway having a canister-side outlet adapted to be coupled in fluid communication to a fuel-vapor recovery canister, the valve housing also being formed to include a valve seat at a fluid-conducting interface to intercept fluid flowing through the valve housing between the tank-side inlet and canister-side outlet,
a pressure-controlled valve having a first side exposed to fuel vapor flowing into the valve housing through the tank-side inlet and the canister-side outlet and an opposite second side exposed to fuel vapor extant in the fuel tank that is communicated to the opposite second side via a valve-pressurization feed passageway exposed to fuel vapor extant in the fuel tank, the pressure-controlled valve being mounted for movement relative to the valve housing to a closed position wherein the first side engages the valve seat to block flow of fuel vapor between the tank and canister passageways and an opened position wherein the first side disengages the valve seat to allow flow of fuel vapor between the tank and canister passageways, and
a valve opener configured to selectively lower pressure of fuel vapor exposed to the opposite second side of the pressure-controlled valve by venting pressurized fuel vapor that has been communicated via the valve-pressurization feed passageway to the opposite second side of the pressure-controlled valve into the canister passageway through a pressurized-vapor bleed passageway for discharge into the atmosphere in response to an electrical input so that the pressure-controlled valve moves from the closed position away from the valve seat to the opened position to allow pressurized fuel vapor to flow from the tank passageway into the canister passageway through the fluid-conducting interface provided between the tank and canister passageways at the valve seat, wherein the valve housing is formed to include a valve compartment containing the pressure-controlled valve, the pressure-controlled valve is arranged to divide the valve compartment into a lower chamber and a separate upper chamber, the pressure-controlled valve is formed to include the pressurized-vapor bleed passageway and the valve opener includes an electronic bleed controller associated with the pressure-controlled valve and arranged to lie normally in a flow-blocking position to block flow of pressurized fuel vapor from the valve-pressurization feed passageway to the canister passageway through the pressurized-vapor bleed passageway and wherein the pressure-controlled valve is arranged to move from the flow-blocking position to a flow-allowing position to allow flow of pressurized fuel vapor from the valve-pressurization feed passageway to the canister passageway through the bleed-passageway to lower pressure of pressurized fuel vapor exposed to the opposite second side of the pressure-controlled valve in response to the electrical input to cause the pressure-controlled valve to move from the closed position away from the valve seat to the opened position to allow pressurized fuel vapor to flow from the tank passageway into the canister passageway, and wherein the valve opener includes a bleed-passageway stopper, a stopper mover arranged to apply a force to yieldably to urge the bleed-passageway stopper to a bleed-blocking position engaging the pressure-controlled valve to block discharge of pressurized fuel vapor from the separate upper chamber of the valve compartment into the canister passageway, and a test-condition valve-opener configured to move the bleed-passageway stopper in opposition to the force applied by the stopper mover from the bleed-blocking position away from the pressure-controlled valve to a bleed-allowing position to hold the pressure-controlled valve in the opened position during a pressurized onboard diagnostics test condition.

12. The tank venting system of claim 11, wherein the test-condition valve-opener includes a lift arm coupled to the pressure-controlled valve and located in the separate upper chamber of the valve compartment and a valve-opening cage coupled to the stopper to move therewith and arranged to engage and move the lift arm relative to the valve housing following movement of the stopper away from bleed-blocking position to a bleed-allowing position to cause the pressure-controlled valve to move to and be supported in an opened position during the pressurized onboard diagnostics test condition.

13. A tank venting system comprising a valve housing formed to include a tank passageway having a tank-side inlet adapted to be coupled in fluid communication to a fuel tank and a canister passageway having a canister-side outlet adapted to be coupled in fluid communication to a fuel-vapor recovery canister, the valve housing also being formed to include a valve seat at a fluid-conducting interface to intercept fluid flowing through the valve housing between the tank-side inlet and canister-side outlet, a pressure-controlled valve having a first side exposed to fuel vapor flowing into the valve housing through the tank-side inlet and the canister-side outlet and an opposite second side exposed to fuel vapor extant in the fuel tank that is communicated to the opposite second side via a valve-pressurization feed passageway exposed to fuel vapor extant in the fuel tank, the pressure-controlled valve being mounted for movement relative to the valve housing to a closed position wherein the first side engages the valve seat to block flow of fuel vapor between the tank and canister passageways and an opened position wherein the first side disengages the valve seat to allow flow of fuel vapor between the tank and canister passageways, and a valve opener configured to selectively lower pressure of fuel vapor exposed to the opposite second side of the pressure-controlled valve by venting pressurized fuel vapor that has been communicated via the valve-pressurization feed passageway to the opposite second side of the pressure-controlled valve into the canister passageway through a pressurized-vapor bleed passageway for discharge into the atmosphere in response to an electrical input so that the pressure-controlled valve moves from the closed position away from the valve seat to the opened position to allow pressurized fuel vapor to flow from the tank passageway into the canister passageway through the fluid-conducting interface provided between the tank and canister passageways at the valve seat, wherein the pressure-controlled valve is formed to include the pressurized-vapor bleed passageway and the valve opener includes an electronic bleed controller associated with the pressure-controlled valve and arranged to lie normally in a flow-blocking position to block flow of pressurized fuel vapor from the valve-pressurization feed passageway to the canister passageway through the pressurized-vapor bleed passageway and wherein the pressure-controlled valve is arranged to move from the flow-blocking position to a flow-allowing position to allow flow of pressurized fuel vapor from the valve-pressurization feed passageway to the canister passageway through the bleed-passageway to lower pressure of pressurized fuel vapor exposed to the opposite second side of the pressure-controlled valve in response to the electrical input to cause the pressure-controlled valve to move from the closed position away from the valve seat to the opened position to allow pressurized fuel vapor to flow from the tank passageway into the canister passageway, wherein the valve housing includes a body including the valve seat, a tank pipe that is formed to include the tank passageway, and a canister pipe that is formed to include the canister passageway, the housing also includes a cap coupled to the body to form a valve compartment containing the pressure-controlled valve to allow movement of the pressure-controlled valve between the closed and opened positions, the pressure-controlled valve is arranged to divide the valve compartment into a lower chamber bounded in part by the first side of the pressure-controlled valve and a separate upper chamber bounded in part by the opposite second side of the pressure-controlled valve, the valve-pressurization feed passageway is formed in the pressure-controlled valve to communicate with the upper chamber of the valve compartment, and an inlet end of the pressurized-vapor bleed passageway is arranged to communicate with the upper chamber of the valve compartment and an outlet end of the pressurized-vapor bleed passageway is arranged to communicate with the canister passageway, wherein the valve opener includes a bleed-passageway stopper that is located in the upper chamber of the valve compartment and that is aligned to lie in close proximity to the inlet end of the pressurized-vapor bleed passageway formed in the pressure-controlled valve and move relative to the pressure-controlled valve during movement of the electronically bleed controller between the flow-allowing and flow-blocking positions to regulate flow of pressurized fuel vapor from the upper portion of the valve compartment to the canister passageway via the pressurized-vapor bleed passageway, and wherein the valve opener includes a bleed-passageway stopper, a stopper mover arranged to apply a force to yieldably to urge the bleed-passageway stopper to a bleed-blocking position engaging the pressure-controlled valve to block discharge of pressurized fuel vapor from the separate upper chamber of the valve compartment into the canister passageway, and a test-condition valve-opener configured to move the bleed-passageway stopper in opposition to the force applied by the stopper mover from the bleed-blocking position away from the pressure-controlled valve to a bleed-allowing position to hold the pressure-controlled valve in the opened position during a pressurized onboard diagnostics test condition.

14. The tank venting system of claim 13, wherein the test-condition valve-opener includes a lift arm coupled to the pressure-controlled valve and located in the separate upper chamber of the valve compartment and a valve-opening cage coupled to the stopper to move therewith and arranged to engage and move the lift arm relative to the valve housing during movement of the stopper away from bleed-blocking position to a bleed-allowing position to cause the pressure-controlled valve to move to and be supported in an opened position during the pressurized onboard diagnostics test condition.

* * * * *